US012726265B2

(12) United States Patent
Suh et al.

(10) Patent No.: US 12,726,265 B2
(45) Date of Patent: Sep. 1, 2026

(54) METHOD AND DEVICE FOR CELL (RE)SELECTION IN EMB-BASED NON-TERRESTRIAL NETWORK

(71) Applicants: HYUNDAI MOTOR COMPANY, Seoul (KR); KIA CORPORATION, Seoul (KR); INHA UNIVERSITY RESEARCH AND BUSINESS FOUNDATION, Incheon (KR)

(72) Inventors: Young Kil Suh, Hwaseong-si (KR); Ho Jun Kim, Hwaseong-si (KR); Ui Hyun Hong, Hwaseong-si (KR); Gene Back Hahn, Hwaseong-si (KR); Hyun Jin Kim, Hwaseong-si (KR); Duk Kyung Kim, Seoul (KR)

(73) Assignees: Hyundai Motor Company, Seoul (KR); Kia Corporation, Seoul (KR); INHA University Research And Business Foundation, Incheon (KR)

( * ) Notice: Subject to any disclaimer, the term of this patent is extended or adjusted under 35 U.S.C. 154(b) by 317 days.

(21) Appl. No.: 18/405,816

(22) Filed: Jan. 5, 2024

(65) Prior Publication Data

US 2024/0146406 A1 May 2, 2024

Related U.S. Application Data

(63) Continuation-in-part of application No. PCT/KR2022/009878, filed on Jul. 7, 2022.

(30) Foreign Application Priority Data

Jul. 7, 2021 (KR) ........................ 10-2021-0089207

(51) Int. Cl.

*H04W 36/00* (2009.01)
*H04B 7/185* (2006.01)

(Continued)

(52) U.S. Cl.

CPC .. *H04B 7/18541* (2013.01); *H04W 36/00835* (2018.08); *H04W 36/00837* (2018.08);

(Continued)

(58) Field of Classification Search

CPC ......... H04W 36/085; H04W 36/00837; H04W 36/00835; H04W 36/083; H04W 36/328;

(Continued)

(56) References Cited

U.S. PATENT DOCUMENTS

2008/0274742 A1* 11/2008 Bi ..................... H04W 36/0088 455/437
2016/0381615 A1* 12/2016 Nagaraja ......... H04W 36/00835 455/436

(Continued)

FOREIGN PATENT DOCUMENTS

KR 10-2020-0071004 A 6/2020
KR 10-2020-0086217 A 7/2020

(Continued)

OTHER PUBLICATIONS

International Search Report dated Oct. 24, 2022 cited in International Patent Application No. PCT/KR2022/009878 (w/English translation).

(Continued)

*Primary Examiner* — Temica M Beamer
(74) *Attorney, Agent, or Firm* — Morgan Lewis & Bockius LLP

(57) ABSTRACT

In a method and device for cell (re)selection in an EMB-based non-terrestrial network. the method of a UE includes the steps of: configuring a candidate cell set which is a set of one or more neighboring cells having a cell timer value greater than the sum of a cell service timer value of a serving cell and a second value among at least one neighboring cell; selecting a candidate cell among the one or more neighbor- (Continued)

ing cells on the basis of the SAT service timer value of each of the one or more neighboring cells belonging to the candidate cell set; and performing a procedure for configuring a connection with the candidate cell.

20 Claims, 16 Drawing Sheets

(51) Int. Cl.
*H04W 36/08* (2009.01)
*H04W 36/32* (2009.01)

(52) U.S. Cl.
CPC ....... *H04W 36/083* (2023.05); *H04W 36/085* (2023.05); *H04W 36/087* (2023.05); *H04W 36/324* (2023.05); *H04W 36/328* (2023.05)

(58) Field of Classification Search
CPC .............. H04W 36/087; H04W 36/324; H04B 7/18541
USPC .......................................................... 455/436
See application file for complete search history.

(56) References Cited

U.S. PATENT DOCUMENTS

| | | | |
|---|---|---|---|
| 2017/0230104 | A1 | 8/2017 | Purkayastha et al. |
| 2020/0052782 | A1 | 2/2020 | Wang et al. |
| 2020/0178135 | A1 | 6/2020 | Yun et al. |
| 2021/0083760 | A1 | 3/2021 | Schmidt et al. |
| 2022/0086715 | A1 | 3/2022 | Hong et al. |

FOREIGN PATENT DOCUMENTS

| | | | |
|---|---|---|---|
| KR | 10-2020-0130255 | A | 11/2020 |
| KR | 10-2021-0040061 | A | 4/2021 |

OTHER PUBLICATIONS

3GPP TR 38.821, "3rd Generation Partnership Project; Technical Specification Group Radio Access Network; Solutions for NR to support non-terrestrial networks (NTN)," V16.0.0, Dec. 2019.

* cited by examiner

FIG. 1B

UE
NG-RAN or 6G-RAN
NR Uu or 6G Uu
satellite
gateway
RRU
base station
NG or 6G
core network
N6
data network

Figure 2B:
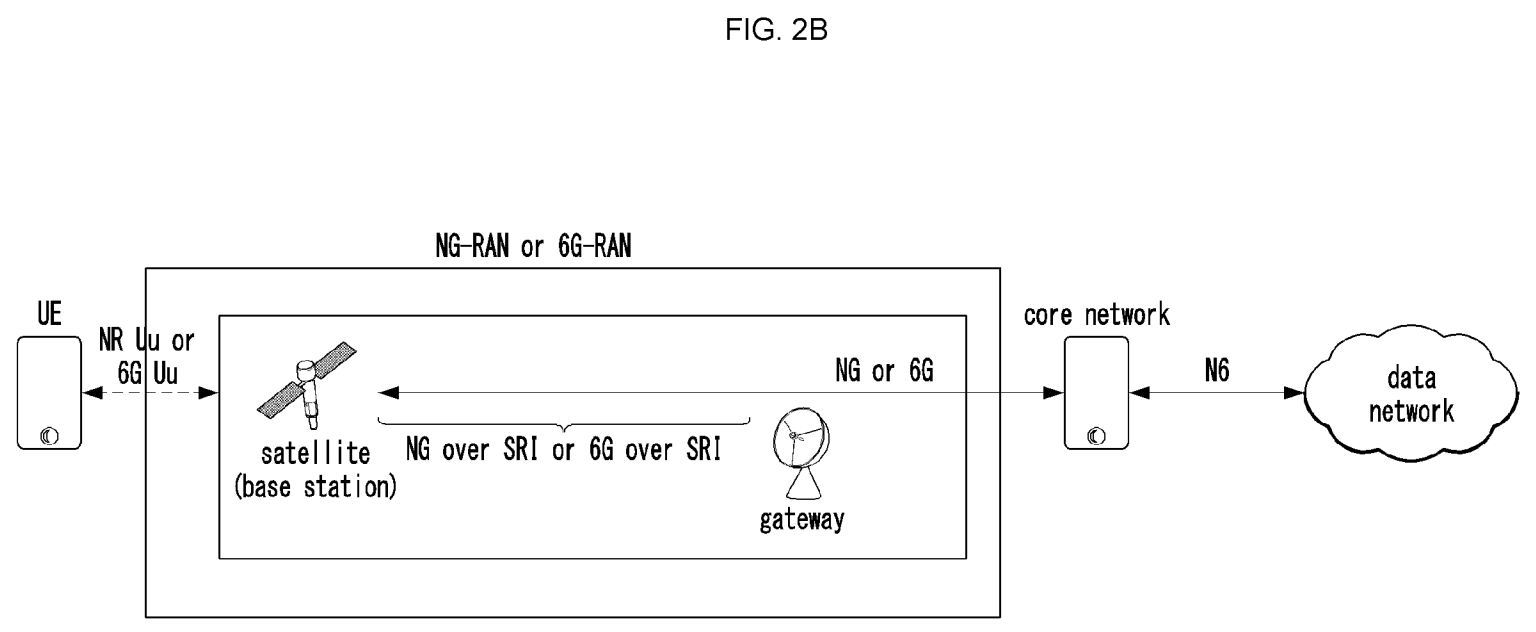

FIG. 2B data network
N6
core network
NG-RAN or 6G-RAN
NG or 6G
gateway
NG over SRI or 6G over SRI
satellite (base station)
NR Uu or 6G Uu
UE

FIG. 4B

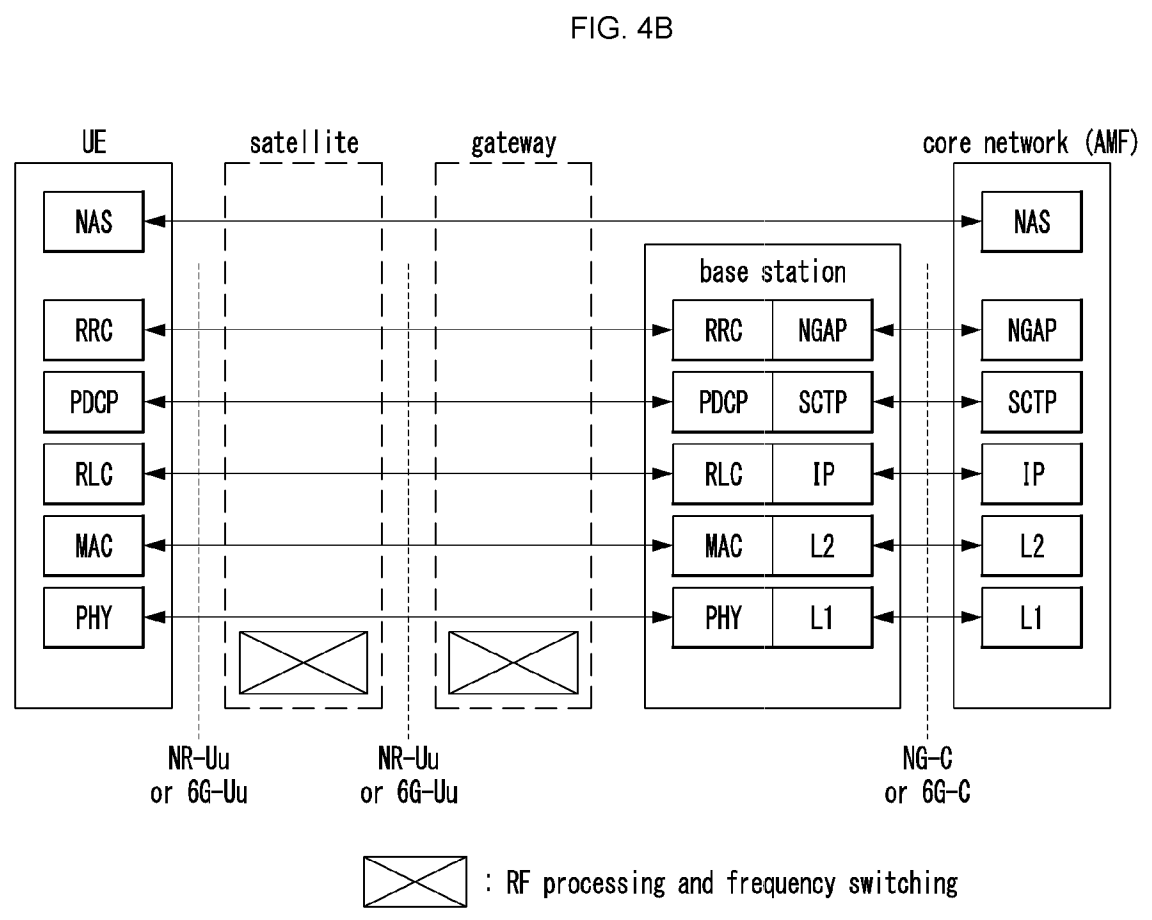

UE
NAS
RRC
PDCP
RLC
MAC
PHY

NR-Uu
or 6G-Uu satellite

NR-Uu
or 6G-Uu gateway base station
RRC NGAP
PDCP SCTP
RLC IP
MAC L2
PHY L1

NG-C
or 6G-C core network (AMF)
NAS
NGAP
SCTP
IP
L2
L1

: RF processing and frequency switching

FIG. 5A

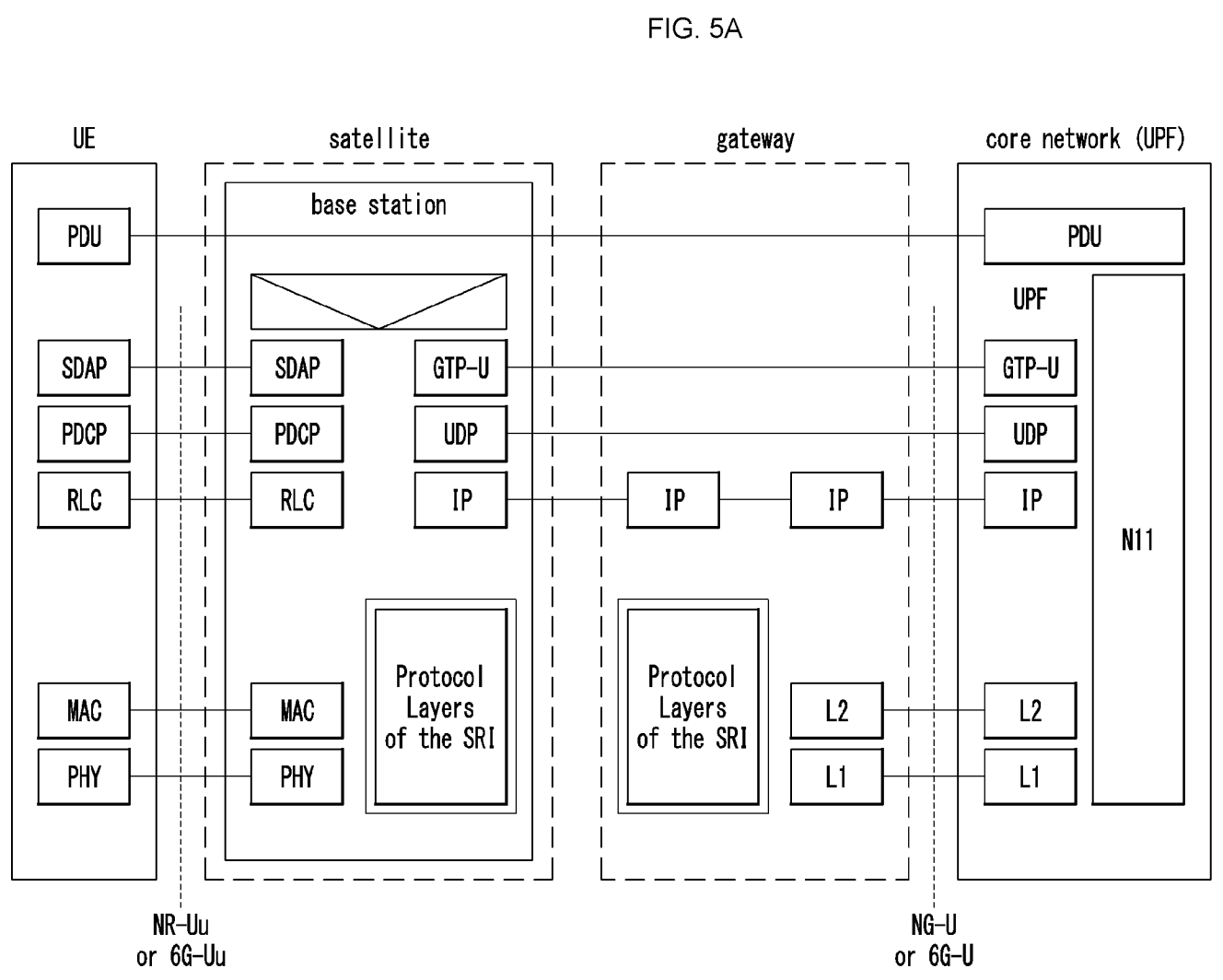

UE
PDU
SDAP
PDCP
RLC
MAC
PHY

NR-Uu or 6G-Uu satellite
base station
SDAP
PDCP
RLC
MAC
PHY
GTP-U
UDP
IP
Protocol Layers of the SRI gateway
IP
IP
L2
L1
Protocol Layers of the SRI NG-U or 6G-U core network (UPF)
PDU
N11
UPF
GTP-U
UDP
IP
L2
L1

FIG. 5B

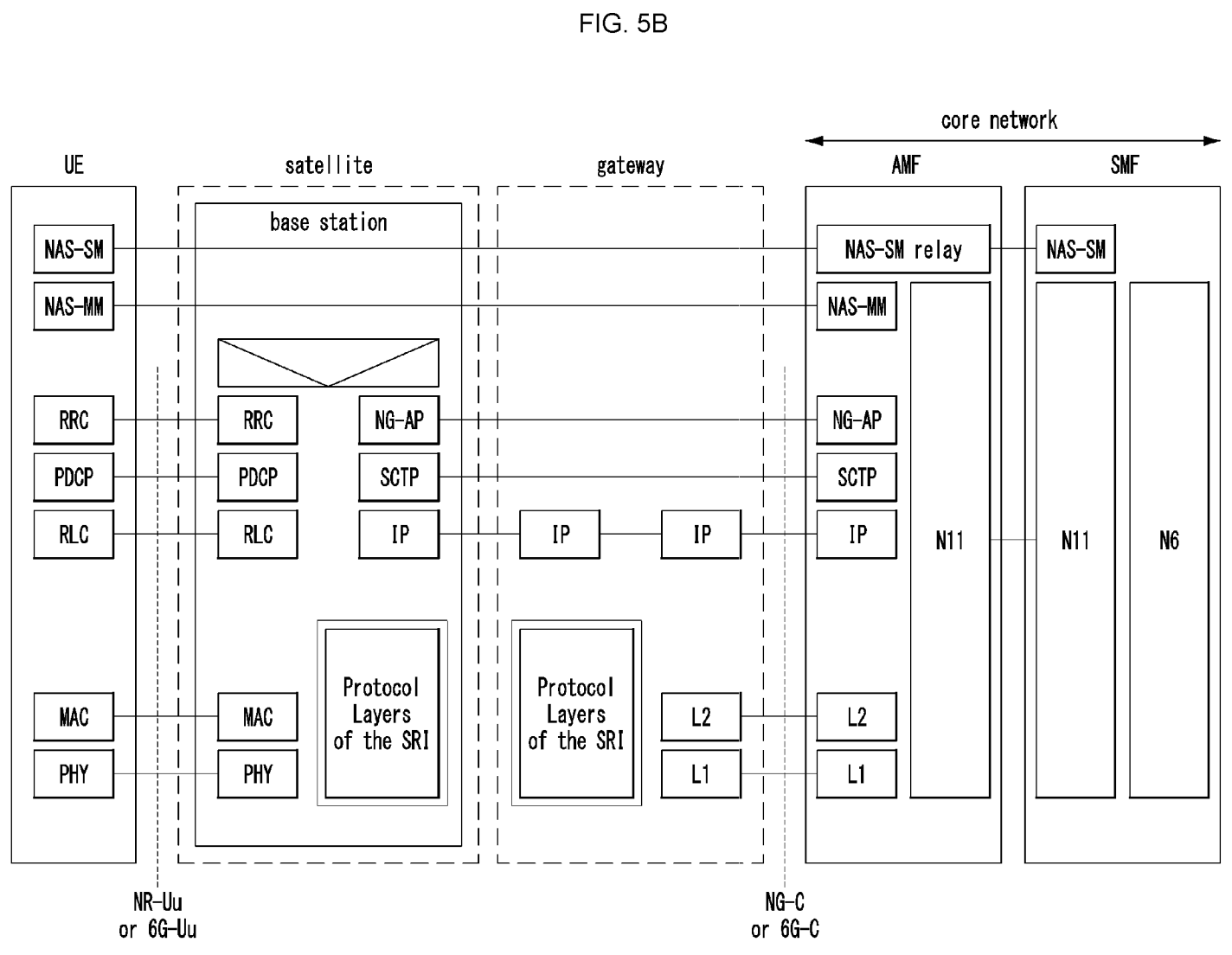

UE
NAS-SM
NAS-MM
RRC
PDCP
RLC
MAC
PHY
NR-Uu or 6G-Uu
satellite
base station
RRC
PDCP
RLC
MAC
PHY
NG-AP
SCTP
IP
Protocol Layers of the SRI
gateway
IP
IP
L2
L1
Protocol Layers of the SRI
NG-C or 6G-C
core network
AMF
NAS-SM relay
NAS-MM
NG-AP
SCTP
IP
L2
L1
N11
SMF
NAS-SM
N11
N6

METHOD AND DEVICE FOR CELL (RE)SELECTION IN EMB-BASED NON-TERRESTRIAL NETWORK

CROSS-REFERENCE TO RELATED APPLICATION

The present application is a continuation-in-part of currently pending International Patent Application No. PCT/KR2022/009878, filed Jul. 7, 2022, which claims priority to Korean Patent Application Number 10-2021-0089207, filed Jul. 7, 2021, the entire contents of which are incorporated herein for all purposes by these references.

BACKGROUND OF THE PRESENT DISCLOSURE

Field of the Present Disclosure

The present disclosure relates to a cell selection technique in a non-terrestrial network, and more particularly, to a cell (re)selection technique in an earth-moving beam (EMB)-based non-terrestrial network.

Description of Related Art

In order to provide enhanced communication services, a communication system (e.g. 5G communication network, 6G communication network, etc.) using a higher frequency band (e.g. a frequency band of 6 GHz or above) than a frequency band (e.g. a frequency band of 6 GHz or below) of the Long Term Evolution (LTE) communication system (or, LTE-A communication system) is being considered. The 5G communication network (e.g. new radio (NR) communication network) may support not only a frequency band of 6 GHz or below, but also a frequency band of 6 GHz or above, and may support various communication services and scenarios compared to the LTE communication network. For example, usage scenarios of the 5G communication network may include enhanced Mobile BroadBand (eMBB), Ultra Reliable Low Latency Communication (URLLC), Massive Machine Type Communication (mMTC), and the like. In addition, in order to provide enhanced communication services compared to the 5G communication network, the 6G communication network may support various and wide frequency bands and may be applied to various usage scenarios (e.g. terrestrial communication, non-terrestrial communication, sidelink communication, and the like).

The communication network (e.g. 5G communication network, 6G communication network, etc.) may provide communication services to terminals located on the ground. Recently, the demand for communication services for not only terrestrial but also non-terrestrial airplanes, drones, and satellites has been increasing, and for this purpose, technologies for a non-terrestrial network (NTN) have been discussed. The non-terrestrial network may be implemented based on 5G communication technology, 6G communication technology, and/or the like. For example, in the non-terrestrial network, communication between a satellite and a terrestrial communication node or a non-terrestrial communication node (e.g. airplane, drone, or the like) may be performed based on 5G communication technology, 6G communication technology, and/or the like. In the NTN, the satellite may perform functions of a base station in a communication network (e.g. 5G communication network, 6G communication network, and/or the like).

Meanwhile, in an NTN environment, satellites move at high speeds, necessitating cell selection and/or reselection for continuous service provision. Additionally, in NTN, the distance between the satellite and a User Equipment (UE) may be significantly larger than the cell size, and variations in the distance between the satellite and the UE may not be significant within a cell coverage. Therefore, the Reference Signal Received Power (RSRP)-based legacy scheme may not provide sufficient performance, unlike in terrestrial networks (TNs). Furthermore, aspects of cell maintenance time and/or satellite maintenance time may differ in an Earth Moving Beam (EMB)-based NTN and an Earth Fixed Beam (EFB)-based NTN. Consequently, an efficient cell selection and/or reselection method is required that takes into account the characteristics of the EMB-based NTN environment.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus for cell (re)selection in a non-terrestrial network.

A method of a user equipment (UE), according to various exemplary embodiments of the present disclosure for achieving the above-described objective, may include: comparing a value of a cell service timer of a serving cell with a first value, the value of the cell service timer indicating a time during which communication services of the serving cell can be provided; in response that the value of the cell service timer of the serving cell is less than or equal to the first value, obtaining configuration information of a cell service timer of each of at least one neighboring cell; configuring a candidate cell set which is a set of one or more neighboring cells among the at least one neighboring cell, the one or more neighboring cells having a value of a cell service timer greater than a sum of the value of the cell service timer of the serving cell and a second value; selecting a candidate cell from among the one or more neighboring cells based on a value of a satellite (SAT) service timer of each of the one or more neighboring cells belonging to the candidate cell set; and performing a connection establishment procedure with the candidate cell.

The method may further comprise, before the comparing of the value of the cell service timer of the serving cell with the first value, receiving configuration information of the cell service timer of the serving cell from a satellite, wherein the configuration information of the cell service timer of the serving cell includes at least one of an initial value of the cell service timer of the serving cell, location information of the UE, ephemeris information of the satellite, or elevation angle information of the satellite.

The method may further comprise, before the comparing of the value of the service timer value of the serving cell with the first value, obtaining the value of the cell service timer of the serving cell, which is preset in the UE.

The cell service timer of the serving cell may start after the UE is connected to the serving cell, and the SAT service timer may start after the UE is connected to the satellite.

In the selecting of the candidate cell from among the one or more neighboring cells based on the value of the SAT service timer of each of the one or more neighboring cells belonging to the candidate cell set, a neighboring cell with a largest value of the SAT service timer value among the one or more neighboring cells may be determined as the candidate cell.

The method may further comprise, after determining a neighboring cell with a largest value of the SAT service timer among the at least one neighboring cell belonging to the candidate cell set as the candidate cell, measuring a reception quality of the candidate cell for a preset time; and in response that the reception quality of the candidate cell is equal to or higher than a third value for a preset time, performing a connection establishment procedure with the candidate cell.

The method may further comprise, after determining a neighboring cell with a largest value of the SAT service timer among the at least one neighboring cell belonging to the candidate cell set as the candidate cell, measuring a reception quality of the candidate cell for a preset time; and in response that the reception quality of the candidate cell is less than a third value and a number of cells belonging to the candidate cell set is plural, determining a cell with a second largest value of the SAT service timer among cells belonging to the candidate cell set as the candidate cell.

The method may further include: receiving variable measurement configuration information from a satellite; and performing variable measurement procedures instead of general measurement procedures based on the variable measurement configuration information, wherein a measurement periodicity in the variable measurement procedures is shorted than a measurement periodicity in the general measurement procedures.

The variable measurement configuration information may include intermittent measurement configuration information and frequent measurement configuration information, intermittent measurement procedures may be performed based on the intermittent measurement configuration information when the value of the cell service timer of the serving cell exceeds a fourth value, and frequent measurement procedures may be performed based on the frequent measurement configuration information when a value of a cell service timer of the candidate cell is less than or equal to the fourth value.

The method may further include: in response that the value of the cell service timer of the serving cell is equal to or less than a threshold, triggering a cell reselection procedure.

A user equipment (UE), according to various exemplary embodiments of the present disclosure for achieving the above-described objective, may include: a processor; and a memory storing one or more instructions executable by the processor. The one or more instructions may be executed to perform: receiving configuration information of a cell service timer of a serving cell from a satellite, the cell service timer indicating a time during which communication services of the serving cell can be provided; comparing a value of the cell service timer of the serving cell with a first value; in response that the value of the cell service timer of the serving cell is less than or equal to the first value, obtaining configuration information of a cell service timer of each of at least one neighboring cell; configuring a candidate cell set which is a set of one or more neighboring cells among the at least one neighboring cell, the one or more neighboring cells having a value of a cell service timer greater than a sum of the value of the cell service timer of the serving cell and a second value; selecting a candidate cell from among the one or more neighboring cells based on a value of a satellite (SAT) service timer of each of the one or more neighboring cells belonging to the candidate cell set; and performing a connection establishment procedure with the candidate cell.

In the comparing of the value of the cell service timer of the serving cell with the first value, the one or more instructions may be further executed to perform: receiving the configuration information of the cell service timer of the serving cell from the satellite, and the configuration information of the cell service timer of the serving cell includes at least one of an initial value of the cell service timer of the serving cell, location information of the UE, ephemeris information of the satellite, or elevation angle information of the satellite.

In the comparing of the value of the service timer value of the serving cell with the first value, the one or more instructions may be further executed to perform: obtaining the value of the cell service timer of the serving cell, which is preset in the UE.

The cell service timer of the serving cell may start after the UE is connected to the serving cell, and the SAT service timer may start after the UE is connected to the satellite.

In the selecting of the candidate cell from among the one or more neighboring cells based on the value of the SAT service timer of each of the one or more neighboring cells belonging to the candidate cell set, the one or more instructions may be further executed to perform: selecting a neighboring cell with a largest value of the SAT service timer value among the one or more neighboring cells as the candidate cell.

When a neighboring cell with a largest value of the SAT service timer among the at least one neighboring cell belonging to the candidate cell set is determined as the candidate cell, the one or more instructions may be further executed to perform: measuring a reception quality of the candidate cell for a preset time; and in response that the reception quality of the candidate cell is equal to or higher than a third value for a preset time, performing communication with the candidate cell.

When a neighboring cell with a largest value of the SAT service timer among the at least one neighboring cell belonging to the candidate cell set is determined as the candidate cell, the one or more instructions may be further executed to perform: measuring a reception quality of the candidate cell for a preset time; and in response that the reception quality of the candidate cell is less than a third value and a number of cells belonging to the candidate cell set is plural, determining a cell with a second largest value of the SAT service timer among cells belonging to the candidate cell set as the candidate cell.

The one or more instructions may be further executed to perform: receiving variable measurement configuration information from a satellite; and performing variable measurement procedures instead of general measurement procedures based on the variable measurement configuration information, wherein a measurement periodicity in the variable measurement procedures is shorted than a measurement periodicity in the general measurement procedures.

The variable measurement configuration information may include intermittent measurement configuration information and frequent measurement configuration information, intermittent measurement procedures may be performed based on the intermittent measurement configuration information when the value of the cell service timer of the serving cell exceeds a fourth value, and frequent measurement procedures may be performed based on the frequent measurement configuration information when a value of a cell service timer of the candidate cell is less than or equal to the fourth value.

The one or more instructions may be further executed to perform: in response that the value of the cell service timer of the serving cell is equal to or less than a threshold, triggering a cell reselection procedure.

According to an exemplary embodiment of the present disclosure, a satellite may set timer(s) for cell selection and/or reselection procedures in a UE. The UE can perform each cell selection and/or reselection procedure based on at least one of the timer(s) or reception quality. Additionally, measurement procedures in the UE may be variably performed based on the timer(s). As a result, the cell selection procedure and/or measurement procedure in the non-terrestrial network can be efficiently executed, leading to an improvement in the performance of the non-terrestrial network.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1B is a conceptual diagram illustrating a second exemplary embodiment of a non-terrestrial network.

FIG. 2B is a conceptual diagram illustrating a fourth exemplary embodiment of a non-terrestrial network.

FIG. 4B is a conceptual diagram illustrating a first exemplary embodiment of a protocol stack of a control plane in a transparent payload-based non-terrestrial network.

FIG. 5A is a conceptual diagram illustrating a first exemplary embodiment of a protocol stack of a user plane in a regenerative payload-based non-terrestrial network.

FIG. 5B is a conceptual diagram illustrating a first exemplary embodiment of a protocol stack of a control plane in a regenerative payload-based non-terrestrial network.

Figure 1A:
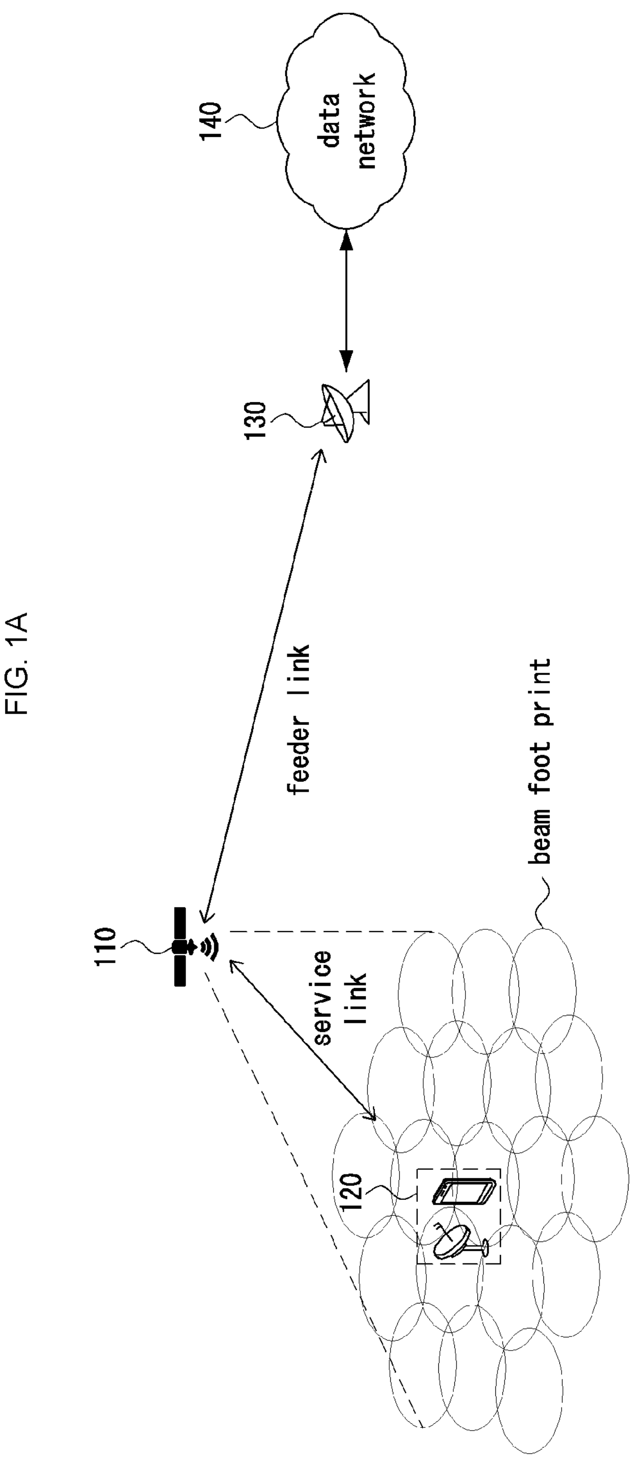
FIG. 1A is a conceptual diagram illustrating a first exemplary embodiment of a non-terrestrial network.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may refer to "transmission", "retransmission", or "transmission and retransmission", "(re)configuration" may refer to "configuration", "reconfiguration", or "configuration and reconfiguration", "(re)connection" may refer to "connection", "reconnection", or "connection and reconnection", "(re)access" may mean "access", "re-access", or "access and re-access", and "(re)selection" may mean "selection", "reselection", or "selection and reselection".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprise" and/or "include" when used herein, specify the presence of stated features, integers, steps, operations, elements, components or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted. In addition to the exemplary embodiments explicitly described in the present disclosure, operations may be performed according to a combination of the exemplary embodiments, extensions of the exemplary embodiments, and/or modifications of the exemplary embodiments. Performance of some operations may be omitted, and the order of performance of operations may be changed.

Even when a method (e.g. transmission or reception of a signal) performed at a first communication node among communication nodes is described, a corresponding second communication node may perform a method (e.g. reception or transmission of the signal) corresponding to the method performed at the first communication node. That is, when an operation of a user equipment (UE) is described, a base station corresponding to the UE may perform an operation corresponding to the operation of the UE. Conversely, when an operation of a base station is described, a UE corresponding to the base station may perform an operation corresponding to the operation of the base station. In a non-terrestrial network (NTN) (e.g. payload-based NTN), operations of a base station may refer to operations of a satellite, and operations of a satellite may refer to operations of a base station.

The base station may refer to a NodeB, evolved NodeB (eNodeB), next generation node B (gNodeB), gNB, device, apparatus, node, communication node, base transceiver station (BTS), radio remote head (RRH), transmission reception point (TRP), radio unit (RU), road side unit (RSU), radio transceiver, access point, access node, and/or the like. The UE may refer to a terminal, device, apparatus, node, communication node, end node, access terminal, mobile terminal, station, subscriber station, mobile station, portable subscriber station, on-broad unit (OBU), and/or the like.

In exemplary embodiments, signaling may be at least one of higher layer signaling, medium access control (MAC) signaling, or physical (PHY) signaling. Messages used for higher layer signaling may be referred to as 'higher layer messages' or 'higher layer signaling messages'. Messages used for MAC signaling may be referred to as 'MAC messages' or 'MAC signaling messages'. Messages used for PHY signaling may be referred to as 'PHY messages' or 'PHY signaling messages'. The higher layer signaling may refer to a transmission and reception operation of system information (e.g. master information block (MIB), system information block (SIB)) and/or RRC messages. The MAC signaling may refer to a transmission and reception operation of a MAC control element (CE). The PHY signaling may refer to a transmission and reception operation of control information (e.g. downlink control information (DCI), uplink control information (UCI), and sidelink control information (SCI)).

In exemplary embodiments, "an operation (e.g. transmission operation) is configured" may mean that "configuration information (e.g. information element(s) or parameter(s)) for the operation and/or information indicating to perform the operation is signaled". "Information element(s) (e.g. parameter(s)) are configured" may mean that "corresponding information element(s) are signaled".

A communication system may include at least one of a terrestrial network, non-terrestrial network, 4G communication network (e.g. long-term evolution (LTE) communication network), 5G communication network (e.g. new radio (NR) communication network), or 6G communication network. Each of the 4G communications network, 5G communications network, and 6G communications network may include a terrestrial network and/or a non-terrestrial network. The non-terrestrial network may operate based on at least one communication technology among the LTE communication technology, 5G communication technology, or 6G communication technology. The non-terrestrial network may provide communication services in various frequency bands.

The communication network to which exemplary embodiments are applied is not limited to the content described below, and the exemplary embodiments may be applied to various communication networks (e.g. 4G communication network, 5G communication network, and/or 6G communication network). Here, a communication network may be used in the same sense as a communication system.

FIG. 1A is a conceptual diagram illustrating a first exemplary embodiment of a non-terrestrial network.

As shown in FIG. 1A, a non-terrestrial network (NTN) may include a satellite 110, a communication node 120, a gateway 130, a data network 140, and the like. A unit including the satellite 110 and the gateway 130 may correspond to a remote radio unit (RRU). The NTN shown in FIG. 1A may be an NTN based on a transparent payload. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS). A non-GEO satellite may be an LEO satellite and/or MEO satellite.

The communication node 120 may include a communication node (e.g. a user equipment (UE) or a terminal) located on a terrestrial site and a communication node (e.g. an airplane, a drone) located on a non-terrestrial space. A service link may be established between the satellite 110 and the communication node 120, and the service link may be a radio link. The satellite 110 may provide communication services to the communication node 120 using one or more beams. The shape of a footprint of the beam of the satellite 110 may be elliptical or circular.

The communication node 120 may perform communications (e.g. downlink communication and uplink communication) with the satellite 110 using 4G communication technology, 5G communication technology, and/or 6G communication technology. The communications between the satellite 110 and the communication node 120 may be performed using an NR-Uu interface and/or 6G-Uu interface. When dual connectivity (DC) is supported, the communication node 120 may be connected to other base stations (e.g. base stations supporting 4G, 5G, and/or 6G functionality) as well as the satellite 110, and perform DC operations based on the techniques defined in 4G, 5G, and/or 6G technical specifications.

The gateway 130 may be located on a terrestrial site, and a feeder link may be established between the satellite 110 and the gateway 130. The feeder link may be a radio link. The gateway 130 may be referred to as a 'non-terrestrial network (NTN) gateway'. The communications between the satellite 110 and the gateway 130 may be performed based on an NR-Uu interface, a 6G-Uu interface, or a satellite radio interface (SRI). The gateway 130 may be connected to the data network 140. There may be a 'core network' between the gateway 130 and the data network 140. In this case, the gateway 130 may be connected to the core network, and the core network may be connected to the data network 140. The core network may support the 4G communication technology, 5G communication technology, and/or 6G communication technology. For example, the core network may include an access and mobility management function (AMF), a user plane function (UPF), a session management function (SMF), and the like. The communications between the gateway 130 and the core network may be performed based on an NG-C/U interface or 6G-C/U interface.

Figure 1B:
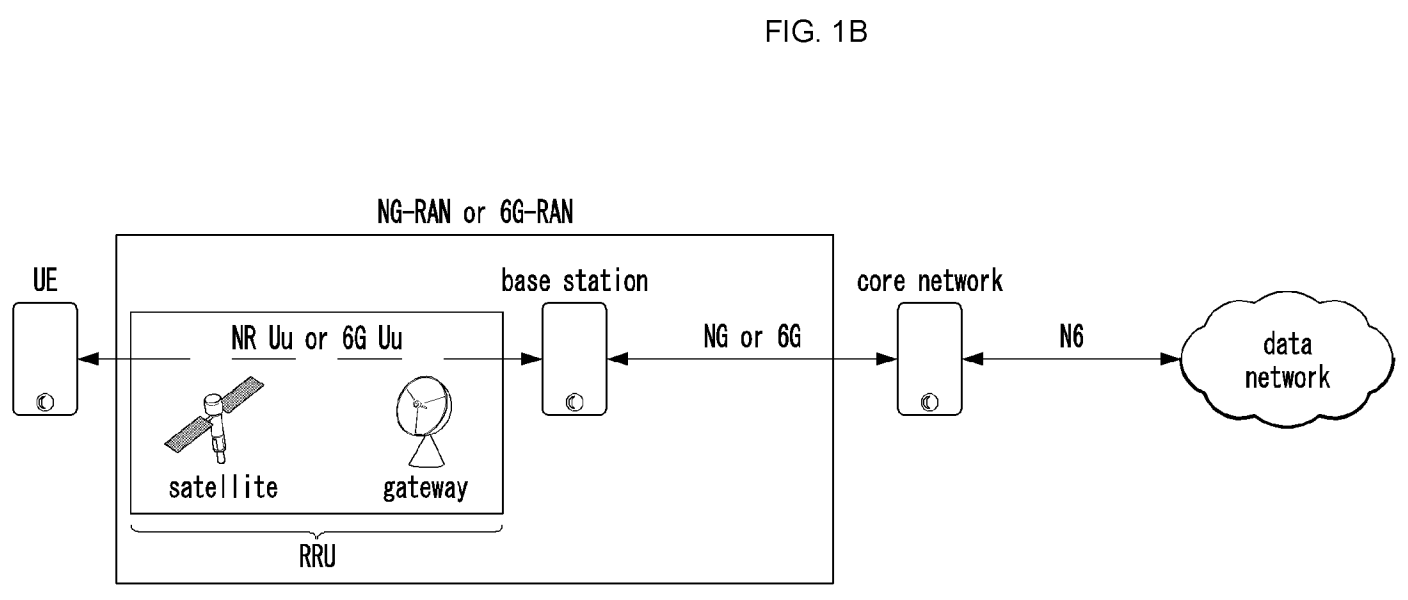

As shown in an exemplary embodiment of FIG. 1B, there may be a 'core network' between the gateway 130 and the data network 140 in a transparent payload-based NTN.

FIG. 1B is a conceptual diagram illustrating a second exemplary embodiment of a non-terrestrial network.

As shown in FIG. 1B, the gateway may be connected to the base station, the base station may be connected to the core network, and the core network may be connected to the data network. Each of the base station and core network may support the 4G communication technology, 5G communication technology, and/or 6G communication technology. The communications between the gateway and the base station may be performed based on an NR-Uu interface or 6G-Uu interface, and the communications between the base station and the core network (e.g. AMF, UPF, SMF, and the like) may be performed based on an NG-C/U interface or 6G-C/U interface.

Figure 2A:
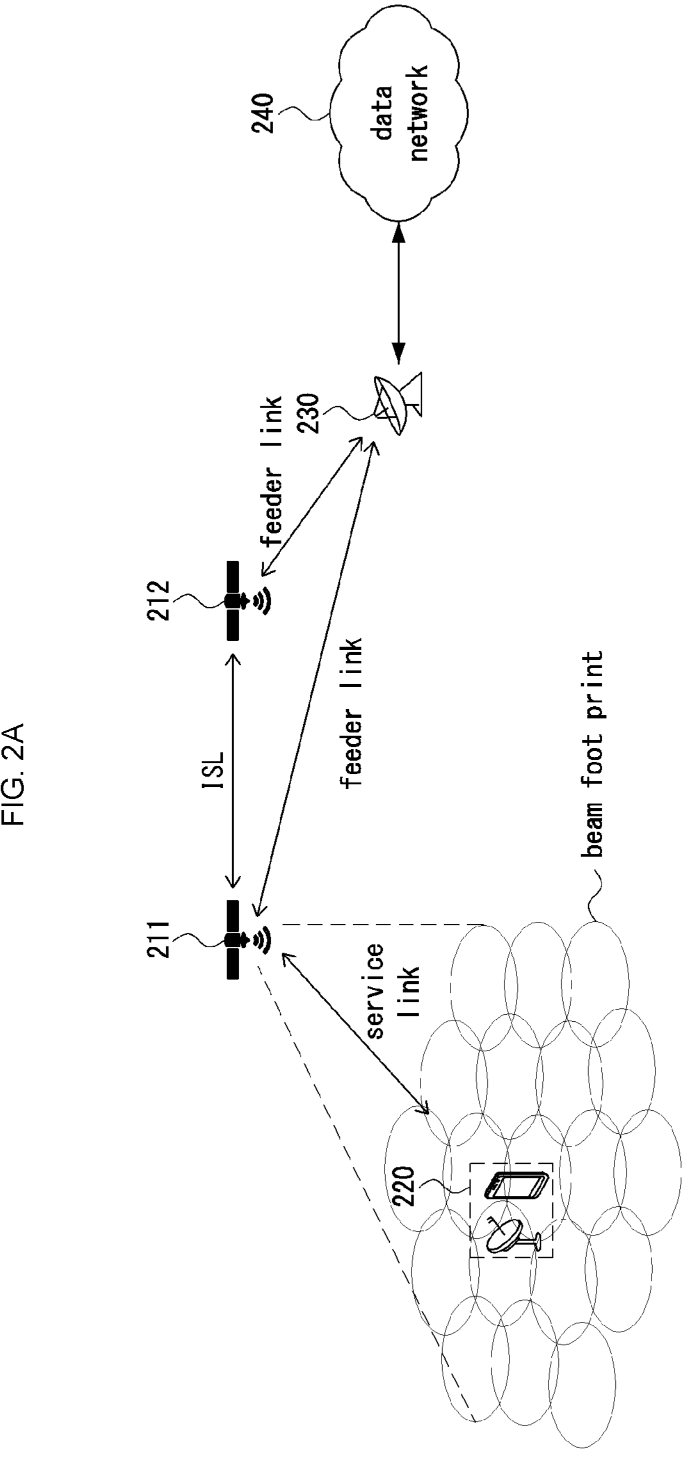
FIG. 2A is a conceptual diagram illustrating a third exemplary embodiment of a non-terrestrial network.

FIG. 2A is a conceptual diagram illustrating a third exemplary embodiment of a non-terrestrial network.

As shown in FIG. 2A, a non-terrestrial network may include a first satellite 211, a second satellite 212, a communication node 220, a gateway 230, a data network 240, and the like. The NTN shown in FIG. 2A may be a regenerative payload based NTN. For example, each of the satellites 211 and 212 may perform a regenerative operation (e.g. demodulation, decoding, re-encoding, re-modulation, and/or filtering operation) on a payload received from other entities (e.g. the communication node 220 or the gateway 230), and transmit the regenerated payload.

Each of the satellites 211 and 212 may be a LEO satellite, a MEO satellite, a GEO satellite, a HEO satellite, or a UAS platform. The UAS platform may include a HAPS. The satellite 211 may be connected to the satellite 212, and an inter-satellite link (ISL) may be established between the satellite 211 and the satellite 212. The ISL may operate in an RF frequency band or an optical band. The ISL may be established optionally. The communication node 220 may include a terrestrial communication node (e.g. UE or terminal) and a non-terrestrial communication node (e.g. airplane or drone). A service link (e.g. radio link) may be established between the satellite 211 and communication node 220. The satellite 211 may provide communication services to the communication node 220 using one or more beams.

The communication node 220 may perform communications (e.g. downlink communication or uplink communication) with the satellite 211 using the 4G communication technology, 5G communication technology, and/or 6G communication technology. The communications between the satellite 211 and the communication node 220 may be performed using an NR-Uu interface or 6G-Uu interface. When DC is supported, the communication node 220 may be connected to other base stations (e.g. base stations supporting 4G, 5G, and/or 6G functionality) as well as the satellite 211, and may perform DC operations based on the techniques defined in 4G, 5G, and/or 6G technical specifications.

The gateway 230 may be located on a terrestrial site, a feeder link may be established between the satellite 211 and the gateway 230, and a feeder link may be established between the satellite 212 and the gateway 230. The feeder link may be a radio link. When the ISL is not established between the satellite 211 and the satellite 212, the feeder link between the satellite 211 and the gateway 230 may be established mandatorily. The communications between each of the satellites 211 and 212 and the gateway 230 may be performed based on an NR-Uu interface, a 6G-Uu interface, or an SRI. The gateway 230 may be connected to the data network 240.

Figure 2C:
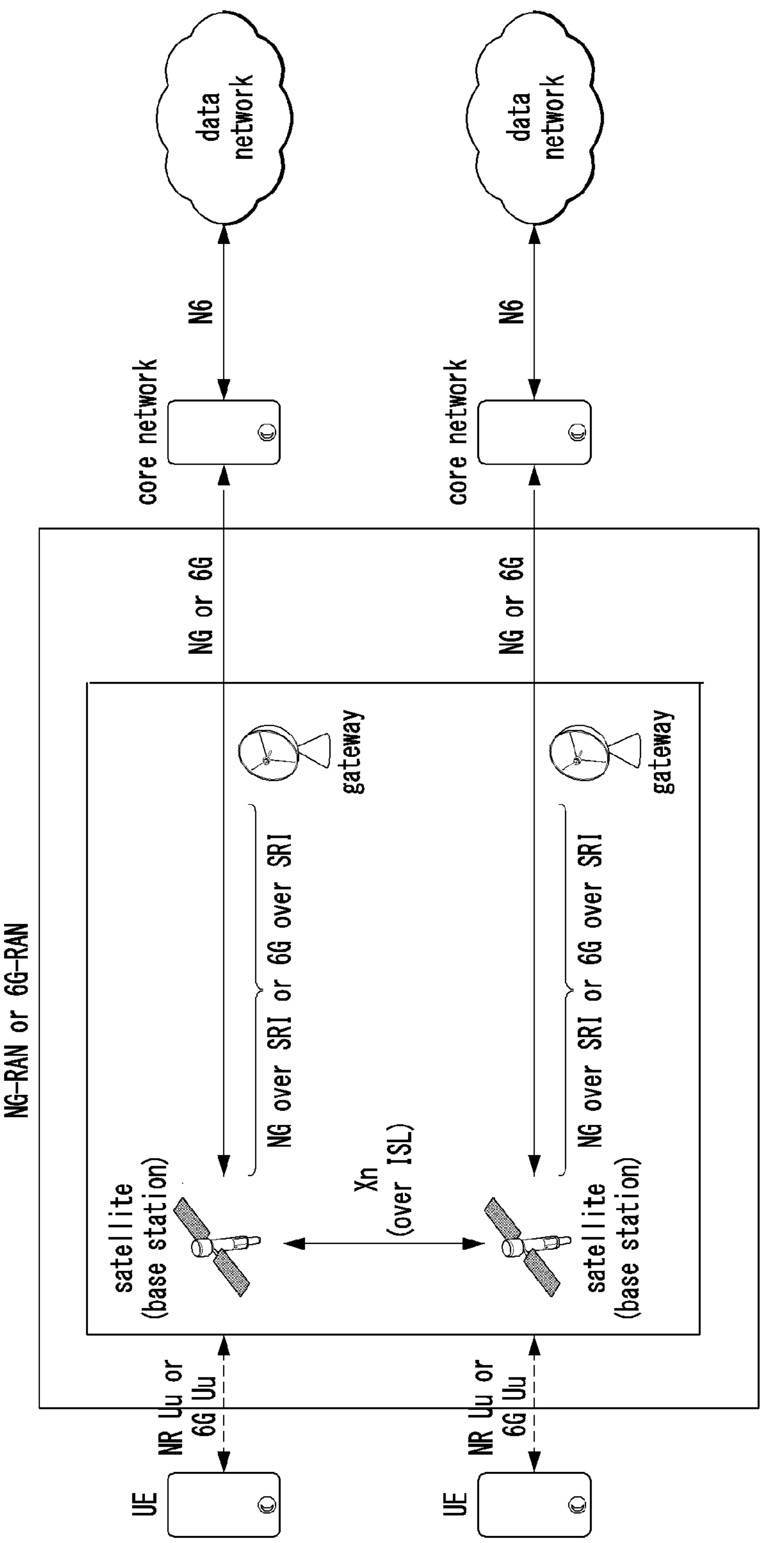
FIG. 2C is a conceptual diagram illustrating a fifth exemplary embodiment of a non-terrestrial network.

As shown in exemplary embodiments of FIG. 2B and FIG. 2C, there may be a 'core network' between the gateway 230 and the data network 240.

FIG. 2B is a conceptual diagram illustrating a fourth exemplary embodiment of a non-terrestrial network, and FIG. 2C is a conceptual diagram illustrating a fifth exemplary embodiment of a non-terrestrial network.

As shown in FIG. 2B and FIG. 2C, the gateway may be connected to the core network, and the core network may be connected to the data network. The core network may support the 4G communication technology, 5G communication technology, and/or 6G communication technology. For example. The core network may include AMF, UPF, SMF, and the like. Communication between the gateway and the core network may be performed based on an NG-C/U interface or 6G-C/U interface. Functions of a base station may be performed by the satellite. That is, the base station may be located on the satellite. A payload may be processed by the base station located on the satellite. Base stations located on different satellites may be connected to the same core network. One satellite may have one or more base stations. In the non-terrestrial network of FIG. 2B, an ISL between satellites may not be established, and in the non-terrestrial network of FIG. 2C, an ISL between satellites may be established.

Meanwhile, the entities (e.g. satellite, base station, UE, communication node, gateway, and the like) constituting the non-terrestrial network shown in FIGS. 1A, 1B, 2A, 2B, and/or 2C may be configured as follows.

Figure 3:
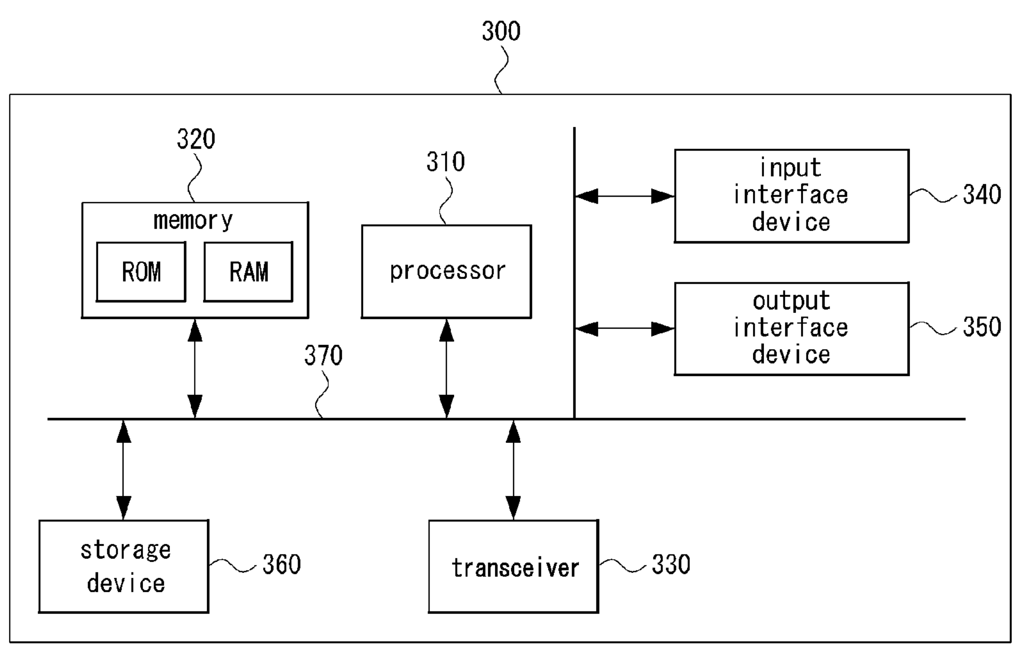
FIG. 3 is a block diagram illustrating a first exemplary embodiment of an entity constituting a non-terrestrial network.

FIG. 3 is a block diagram illustrating a first exemplary embodiment of an entity constituting a non-terrestrial network.

As shown in FIG. 3, an entity 300 may include at least one processor 310, a memory 320, and a transceiver 330 connected to a network to perform communication. In addition, the entity 300 may further include an input interface device 340, an output interface device 350, a storage device 360, and the like. The components included in the entity 300 may be connected by a bus 370 to communicate with each other.

However, each component included in the entity 300 may be connected to the processor 310 through a separate interface or a separate bus instead of the common bus 370. For example, the processor 310 may be connected to at least one of the memory 320, the transceiver 330, the input interface device 340, the output interface device 350, and the storage device 360 through a dedicated interface.

The processor 310 may execute at least one instruction stored in at least one of the memory 320 and the storage device 360. The processor 310 may refer to a central processing unit (CPU), a graphics processing unit (GPU), or a dedicated processor on which the methods according to the exemplary embodiments of the present disclosure are performed. Each of the memory 320 and the storage device 360 may be configured as at least one of a volatile storage medium and a nonvolatile storage medium. For example, the memory 320 may be configured with at least one of a read only memory (ROM) and a random access memory (RAM).

Meanwhile, NTN reference scenarios may be defined as shown in Table 1 below.

TABLE 1

| | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 110 in the NTN shown in FIG. 1A and/or FIG. 1B is a GEO satellite (e.g. a GEO satellite that supports a transparent function), this may be referred to as 'scenario A'. When the satellites 211 and 212 in the NTN shown in FIG. 2A, FIG. 2B, and/or FIG. 2C are GEO satellites (e.g. GEOs that support a regenerative function), this may be referred to as 'scenario B'.

When the satellite 110 in the NTN shown in FIG. 1A and/or FIG. 1B is an LEO satellite with steerable beams, this may be referred to as 'scenario C1'. When the satellite 110 in the NTN shown in FIG. 1A and/or FIG. 1B is an LEO satellite having beams moving with the satellite, this may be referred to as 'scenario C2'. When the satellites 211 and 212 in the NTN shown in FIG. 2A, FIG. 2B, and/or FIG. 2C are LEO satellites with steerable beams, this may be referred to as 'scenario D1'. When the satellites 211 and 212 in the NTN shown in FIG. 2A, FIG. 2B, and/or FIG. 2C are LEO satellites having beams moving with the satellites, this may be referred to as 'scenario D2'. Parameters for the scenarios defined in Table 1 may be defined as shown in Table 2 below.

Parameters for the NTN reference scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g. UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>−5.77 ms (altitude of 600km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Figure 4A:
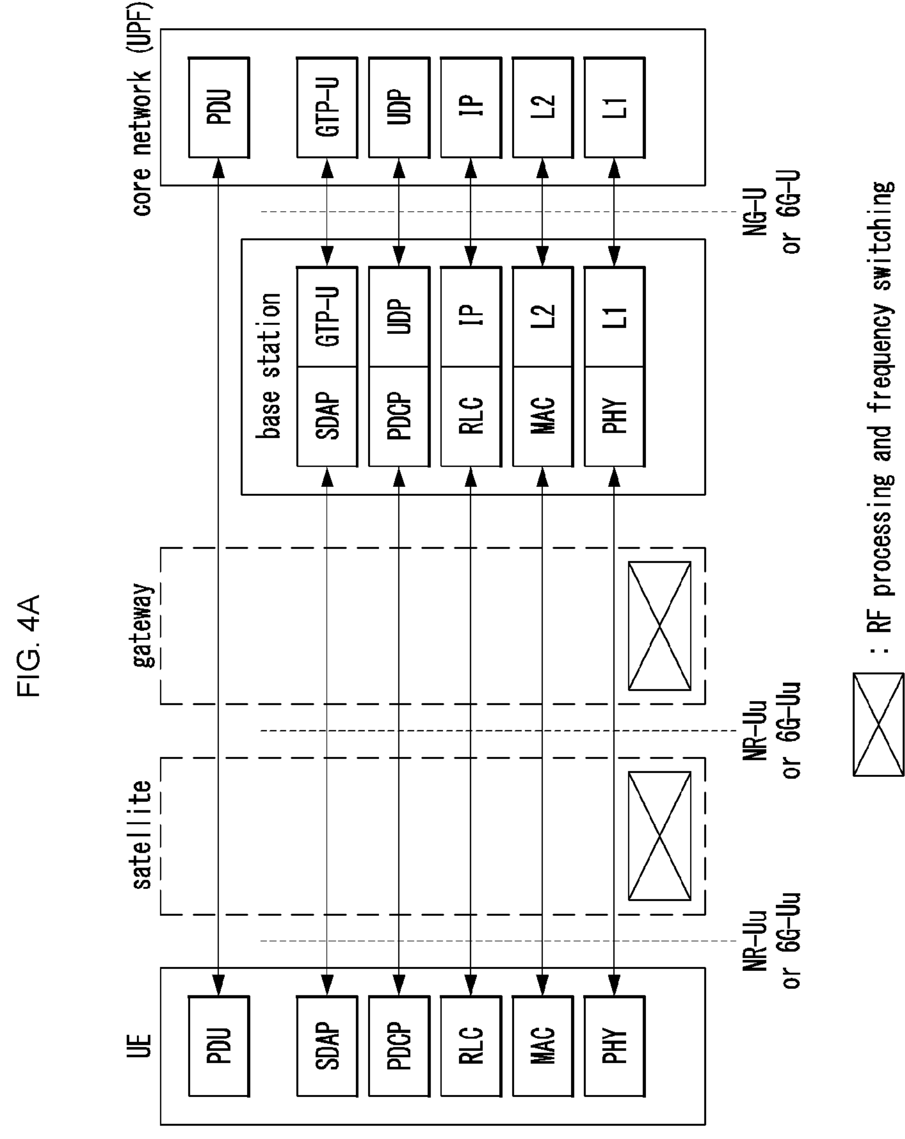
FIG. 4A is a conceptual diagram illustrating a first exemplary embodiment of a protocol stack of a user plane in a transparent payload-based non-terrestrial network.

FIG. 4A is a conceptual diagram illustrating a first exemplary embodiment of a protocol stack of a user plane in a transparent payload-based non-terrestrial network, and FIG. 4B is a conceptual diagram illustrating a first exemplary embodiment of a protocol stack of a control plane in a transparent payload-based non-terrestrial network.

As shown in FIGS. 4A and 4B, user data may be transmitted and received between a UE and a core network (e.g. UPF), and control data (e.g. control information) may be transmitted and received between the UE and the core network (e.g. AMF). Each of the user data the and control data may be transmitted and received through a satellite and/or gateway. The protocol stack of the user plane shown in FIG. 4A may be applied identically or similarly to a 6G communication network. The protocol stack of the control plane shown in FIG. 4B may be applied identically or similarly to a 6G communication network.

FIG. 5A is a conceptual diagram illustrating a first exemplary embodiment of a protocol stack of a user plane in a regenerative payload-based non-terrestrial network, and FIG. 5B is a conceptual diagram illustrating a first exemplary embodiment of a protocol stack of a control plane in a regenerative payload-based non-terrestrial network.

As shown in FIGS. 5A and 5B, each of user data and control data (e.g. control information) may be transmitted and received through an interface between a UE and a satellite (e.g. base station). The user data may refer to a user protocol data unit (PDU). A protocol stack of a satellite radio interface (SRI) may be used to transmit and receive the user data and/or control data between the satellite and a gateway. The user data may be transmitted and received through a general packet radio service (GPRS) tunneling protocol (GTP)-U tunnel between the satellite and a core network.

Figure 6A:
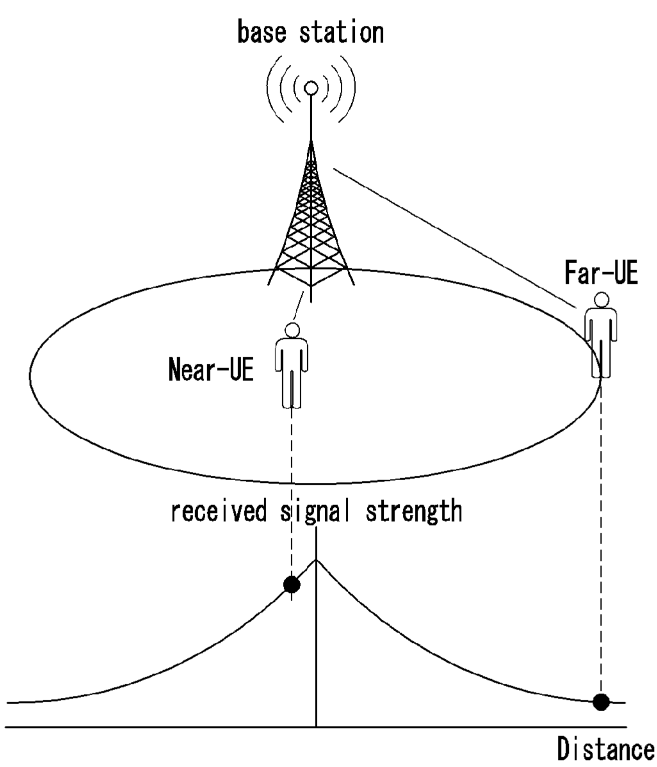
FIG. 6A is a conceptual diagram illustrating a measurement result of reference signal received powers (RSRPs) in a terrestrial network.
Figure 6B:
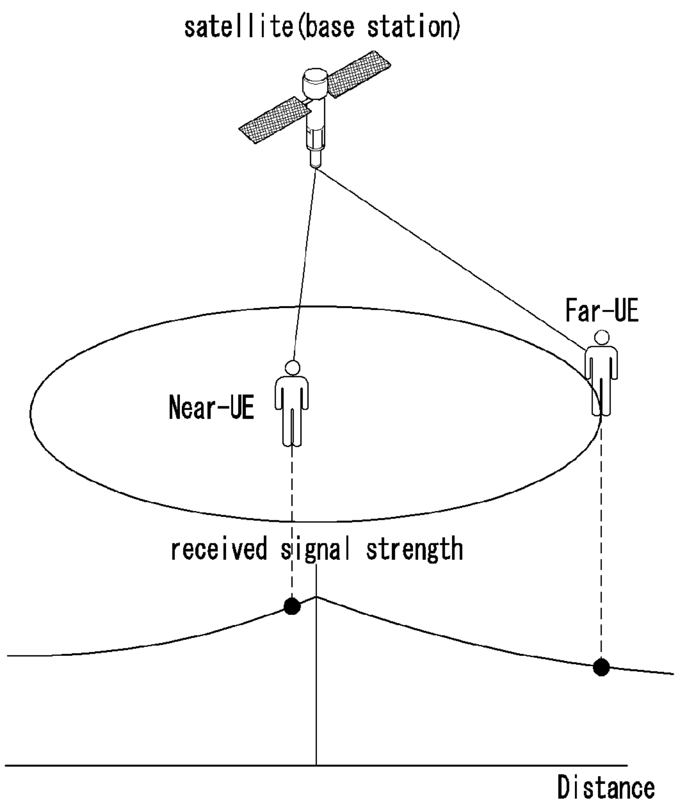
FIG. 6B is a conceptual diagram illustrating a measurement result of RSRPs in a non-terrestrial network.

FIG. 6A is a conceptual diagram illustrating a measurement result of reference signal received powers (RSRPs) in a terrestrial network, and FIG. 6B is a conceptual diagram illustrating a measurement result of RSRPs in a non-terrestrial network.

As shown in FIG. 6A, a path loss exponent may be assumed to be 4, and differences in RSRP according to distances (e.g. 100 meters (m), 500 m, 1 kilometer (km), and 10 km) from a base station in a terrestrial network may be as shown in Table 4 below. A reference position may be represented as a distance from the base station to the corresponding reference position.

TABLE 4

| | Distance from a base station | | | |
|---|---|---|---|---|
| Reference position | 100 m | 500 m | 1 km | 10 km |
| 100 ms | 0dB | −28 dB | −40 dB | −80 dB |
| 500 ms | — | 0 dB | −12 dB | −52 dB |
| 1 km | — | — | 0 dB | −40 dB |
| 10 km | — | — | — | 0 dB |

As shown in FIG. 6B, in a non-terrestrial network, a path loss exponent may be assumed to be 2, and a satellite may be a LEO satellite with an altitude of 600 km. In the non-terrestrial network, a difference in RSRP according to a distance (e.g. 10 km, 50 km, 100 km, 500 km) between a nadir and a UE may be shown in Table 5 below. A distance between the satellite and the UE, depending on the distance between the nadir and the UE, may be 600 km, 602 km, 608 km, or 781 km.

TABLE 5

| | | | | |
|---|---|---|---|---|
| Distance between nadir and UE | 10 km | 50 km | 100 km | 500 km |
| Distance between the satellite and the UE | 600 km | 602 km | 608 km | 781 km |
| Reference position (10 km) | 0 dB | 0 dB | −0.1 dB | −2.3 dB |

In a satellite that supports multi-beam, if a cell radius is about 50 km, a difference in a path length may be small. A distance between the satellite and the UE at 500 km from the nadir is only 781 km, and a difference between an RSRP at 500 km from the nadir and an RSRP at 10 km from the nadir may be −2.3 dB.

Figure 7:
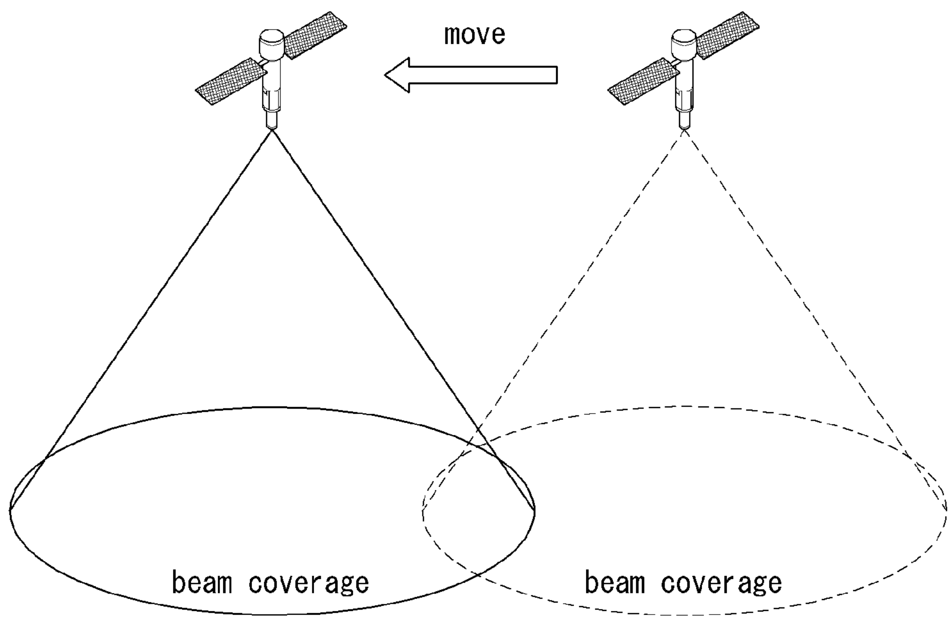
FIG. 7 is a conceptual diagram illustrating changes in a cell coverage according to movement of a satellite in an earth moving beam (EMB) environment.

FIG. 7 is a conceptual diagram illustrating changes in a cell coverage according to movement of a satellite in an earth moving beam (EMB) environment.

As shown in FIG. 7, a beam of a satellite may have earth moving beam (EMB) characteristics. In the instant case, a cell coverage on the ground may continuously change depending on a movement of the satellite. Accordingly, a remaining service time (i.e. cell service time) in a cell where a UE is located (e.g. remaining cell service time) may change depending on a location of the UE. The remaining service time may be a time during which communication services can be provided to the UE in the cell where the UE is located. If the remaining cell service time expires, the UE may need to perform a procedure to (re)select another cell.

Figure 8:
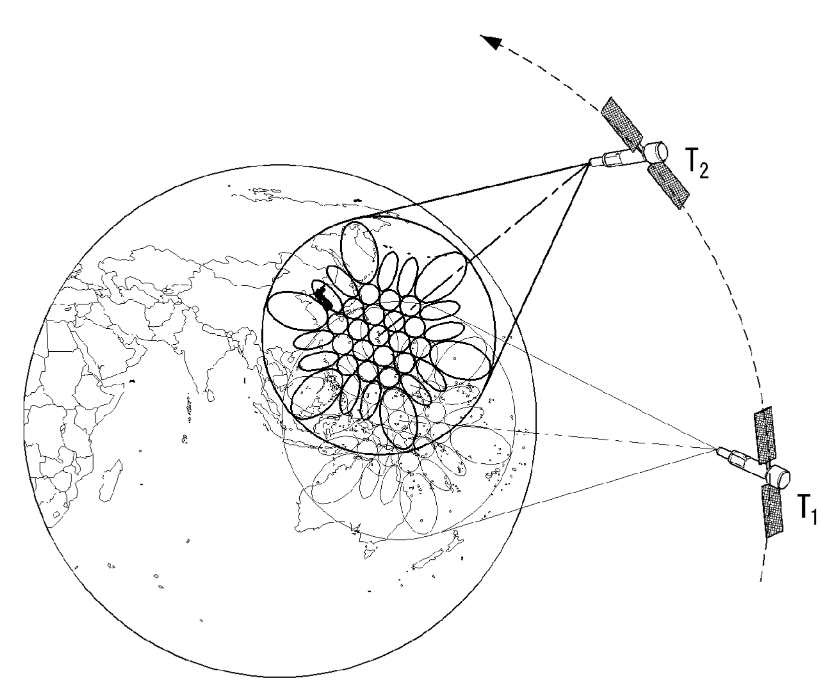
FIG. 8 is a conceptual diagram illustrating changes in a coverage of a satellite and/or cell in an EMB environment supporting multiple beams.

FIG. 8 is a conceptual diagram illustrating changes in a coverage of a satellite and/or cell in an EMB environment supporting multiple beams.

As shown in FIG. 8, a satellite may support EMB. One satellite may form a plurality of cells. The plurality of cells may be configured within a coverage (e.g. beam coverage) of the satellite. In the instant case, each cell may be serviced by one beam or multiple beams. When the satellite moves, the coverage of the satellite or locations of the cells may change.

In addition, aspects of cell maintenance time and/or satellite maintenance time may differ in an earth fixed beam (EFB)-based NTN and an EMB-based NTN. For example, in the EFB-based NTN, a cell coverage fixed to the ground surface may be maintained while a UE belongs to the same satellite through beam steering and/or beam switching until the UE leaves the satellite's coverage. Therefore, when the UE leaves the satellite's coverage, connection to a new satellite may be established. On the other hand, in the EMB-based NTN, a cell may also move as a satellite moves, and continuous cell reselection may be required even when a UE is served by the same satellite. In the instant case, a cell maintenance time and a satellite maintenance time may be different from each other, and in general, the cell maintenance time may have a smaller value than the satellite maintenance time. An efficient cell selection and/or reselection method is needed that takes into account the characteristics of the EMB-based NTN environment.

In the EMB-based NTN, at least one of a cell service time, which is a remaining service time in a cell, or a cell service timer for the cell service time may be introduced. In the NTN, a cell (re)selection procedure may be performed based on the cell service timer.

The cell service timer may operate inside the UE. A base station (e.g. satellite) may configure a cell service timer and signal information on the cell service timer to the UE. Alternatively, the base station may signal an initial value of the cell service timer and/or information element(s) required to determine the cell service timer to the UE. The UE may receive the cell service timer, the initial value of the cell service timer, and/or the information element(s) required to determine the cell service timer from the base station.

Alternatively, the cell service timer may be predefined in the technical specifications. In the instant case, the cell service timer may not be signaled by the base station. That is, the UE may use the predefined cell service timer.

The cell service timer may be referred to as cTimer. The cell service timer may be referred to as a cell expiration timer. The cell service timer may be a timer that defines a time (e.g. remaining time) during which communication services can be provided in the corresponding cell where the UE is located. The cell service timer may have the following characteristic(s).

The cell service timer may be an internal timer of the UE.

In the EMB-based NTN, the cell service timer may be configured UE-specifically.

- The cell service timer may be configured for each satellite or cell. The cell service timers for different cells may be the same or different.
- The cell service timer may be initialized when the UE enters the cell, when the UE is connected to the cell, or when the UE accesses the cell. That is, the cell service timer may be set to the initial value. Thereafter, the cell service timer may decrease at a preset decrement interval. A unit of the decrement interval may be a slot or millisecond. Alternatively, the unit of the decrement interval may be set in various ways. The decrement interval or the unit of the decrement interval may be determined depending on mobility of the UE and/or satellite.
- The decrement interval at which the cell service timer decreases may be corrected in consideration of at least one of the UE's movement speed, UE's movement direction, satellite's movement speed, satellite's movement direction, satellite's type (e.g. LEO, MEO, GEO), or satellite's altitude. For example, a decrement interval when the satellite's movement direction and the UE's movement direction are the same (or similar) may be smaller than a decrement interval when the satellite's movement direction and the UE's movement direction are opposite.
- The (initial) value of the cell service timer may be calculated based on at least one of information element (s) broadcast from the satellite, ephemeris information, the UE's location information (e.g. the UE's location information obtained through a global navigation satellite system (GNSS)), information on a distance from the UE to a center of the cell, or information on a type of the cell (e.g. cell-specific common cell service timer, cell radius, cell shape).
- Additional information element(s) for calculating the initial value of the cell service timer may be broadcast through system information.
- When the cell service timer expires (e.g. when the cell service timer becomes 0), it may be determined that a time during which a communication service can be provided in the cell where the UE is located has expired. To complement the accuracy of the cell service timer, reception quality information (e.g. RSRP, RSRQ, received signal strength indicator (RSSI)) may be used complementarily along with the cell service timer in a cell (re)selection procedure (or handover procedure).

[SAT Service Timer]

A satellite (SAT) service timer may be referred to as sTimer. The SAT service timer may be referred to as a SAT expiration timer. The SAT service timer may be a timer that defines a time (e.g. remaining time) during which communication services can be provided in a coverage of a corresponding satellite where the UE is located. The SAT service timer may have the following characteristic(s).

- The SAT service timer may be an internal timer of the UE.
- In the EMB-based NTN, the SAT service timer may be configured UE-specifically.
- The SAT service timer may be configured for each satellite. The SAT service timers for different satellites may be the same or different.
- The SAT service timer may be initialized when the satellite starts providing communication services to the UE, when the UE is connected to the satellite, or when the UE accesses the satellite. That is, the SAT service timer may be set to an initial value. Thereafter, the SAT service timer may be decreased at a preset decrement interval. A time of initializing the SAT service timer may be a time after the UE receives system information from the satellite and connects to a specific cell among cells configured by the satellite. A unit of the decrement interval may be a slot or millisecond. Alternatively, the unit of the decrement interval may be set in various ways. The decrement interval or the unit of the decrement interval may be the same for UEs. Alternatively, the decrement interval or unit of the decrement interval may be determined depending on mobility of the UE and/or satellite. The SAT service timer may be initialized each time a cell (re)selection procedure or handover procedure is performed.
- The decrement interval at which the SAT service timer decreases may be corrected in consideration of at least one of the UE's movement speed, UE's movement direction, satellite's movement speed, satellite's movement direction, satellite's type (e.g. LEO, MEO, GEO), or satellite's altitude. For example, a decrement interval when the satellite's movement direction and the UE's movement direction are the same (or similar) may be smaller than a decrement interval when the satellite's movement direction and the UE's movement direction are opposite.
- The initial value of the SAT service timer may be calculated based on at least one of information element(s) broadcast from the satellite, ephemeris information, the UE's location information (e.g. the UE's location information obtained through a GNSS), information on a distance from the UE to a coverage center of the satellite, or information on a form of the coverage of the satellite (e.g. coverage radius, coverage shape).
- Additional information element(s) for calculating the initial value of the SAT service timer may be broadcast through system information.
- When the SAT service timer expires (e.g. when the SAT service timer becomes 0), it may be determined that a time during which communication services can be provided by the satellite where the UE is located has expired. To complement the accuracy of the SAT service timer, reception quality information (e.g. RSRP) may be used complementarily together with the SAT service timer in a cell (re)selection procedure (or handover procedure).

Figure 9:
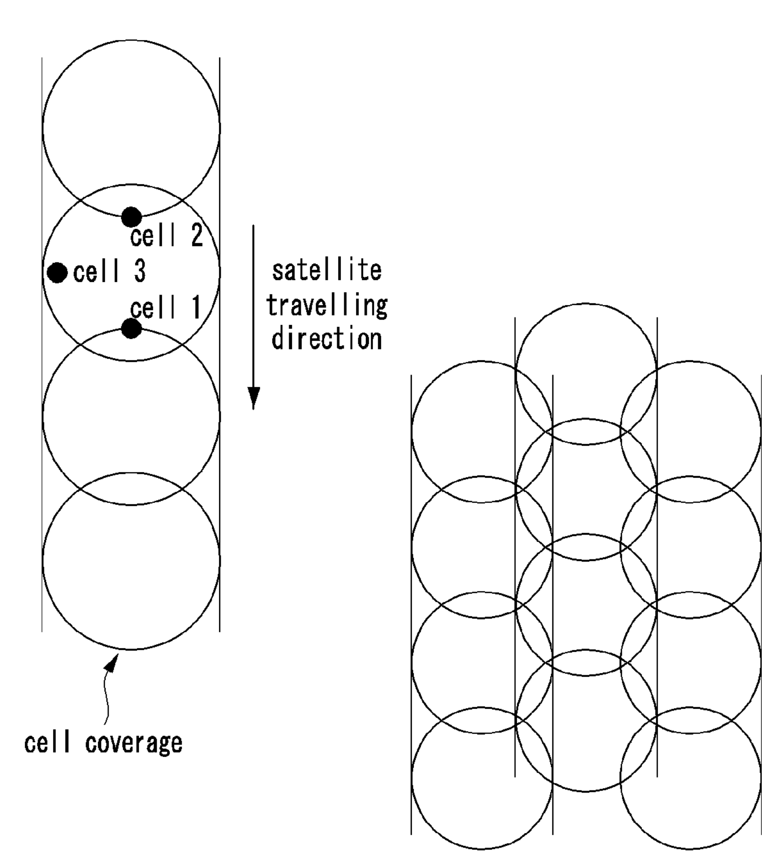
FIG. 9 is a conceptual diagram illustrating a first exemplary embodiment of a SAT service timer value according to cell location in an EMB environment supporting multiple beams.

FIG. 9 is a conceptual diagram illustrating a first exemplary embodiment of a SAT service timer value according to cell location in an EMB environment supporting multiple beams.

As shown in FIG. 9, in an EMB environment, a cell 1, which has just entered a coverage of a satellite, may have a longer SAT service time (e.g. SAT service timer value) than a cell 2, depending on a travelling direction of the satellite. In addition, since a cell 3 is located on the outside of the travelling direction (or path) of the satellite, it may have a shorter SAT service time than the cells 1 or 2, which are located in the inner center of the path of the satellite. The satellite and/or the UE may calculate a SAT service time using at least one of ephemeris information, location information of a cell, or location information of the UE. The UE may receive and/or calculate a SAT service time of a serving cell, and the UE may obtain a SAT service time of a neighboring cell.

Figure 10:
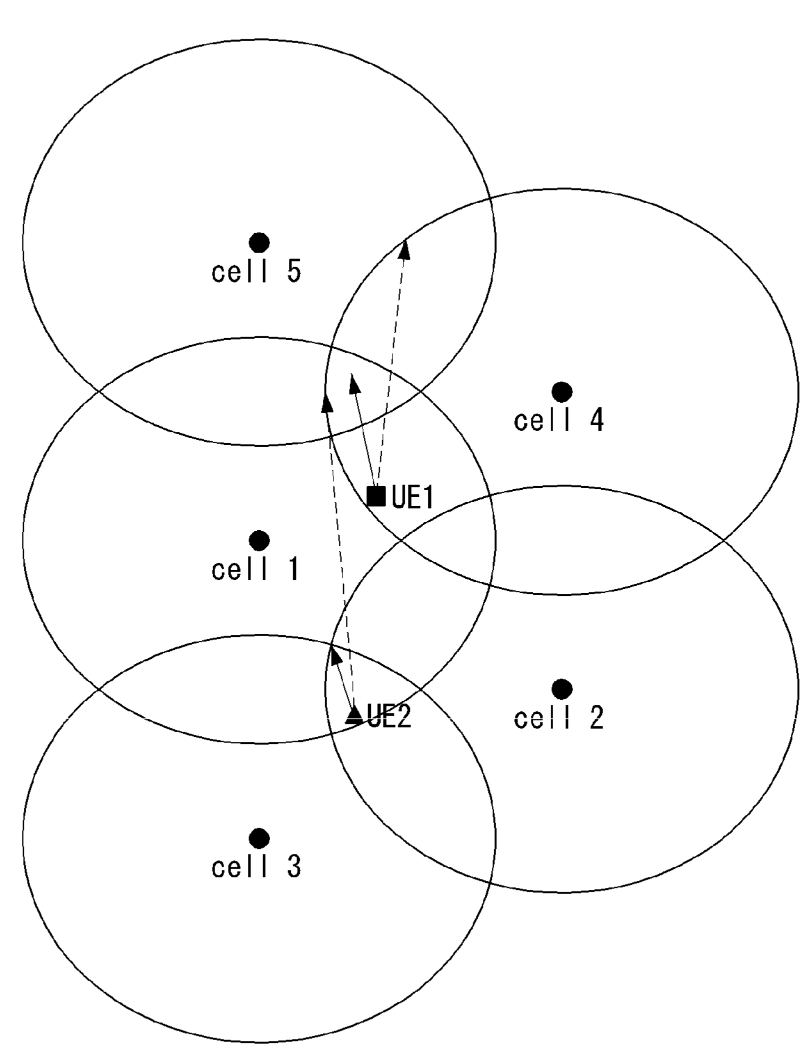
FIG. 10 is a conceptual diagram illustrating a first exemplary embodiment of a cell (re)selection method in an EMB environment supporting multiple beams.

FIG. 10 is a conceptual diagram illustrating a first exemplary embodiment of a cell (re)selection method in an EMB environment supporting multiple beams.

As shown in FIG. 10, it may be assumed that at least one satellite moves from top to bottom, and for example, a case in which a UE selects a cell 1 based on distances from centers of cells may be considered. A UE 1 may be connected to the cell 1 while moving along a solid line. On the other hand, if the UE 1 selects a cell 4 considering a cell service time, the UE 1 may be connected to the cell 4 while moving along a dotted line and may be connected to the cell longer than when selecting the cell 1. Accordingly, when the UE 1 selects the cell 4, the number of cell (re)selections may decrease, but a channel quality may be worse compared to when the UE 1 selects the cell 1. Also in case of a UE 2, the UE 2 may be connected to a cell longer when selecting the cell 1 than when selecting cell the 3, and although the number of cell (re)selections may decrease, a channel quality may be poor. Therefore, a cell (re)selection method that considers a cell service time and/or reception quality is needed.

[Variable Measurement Procedure]

In an LEO-based NTN, if a UE selects a specific cell of a satellite (e.g. LEO satellite), a possibility that a connection between the UE and the specific cell is maintained for a predetermined time may be large considering an orbit and/or movement speed of the satellite. If a value of a cell service timer cTimer is large, a possibility of selecting a new cell in the NTN where the satellite's orbit is deterministic may be low. Therefore, a need for measurement procedures may be low. On the other hand, when the value of the cell service timer is decreased or when the value of the cell service timer is equal to or less than a certain threshold, it may be necessary for measurement procedures to be performed frequently.

If the value of the cell service timer exceeds a specific threshold, intermittent measurement procedures (e.g. first measurement procedures) may be performed. If the value of the cell service timer is equal to or less than the specific threshold, frequent measurement procedures (e.g. second measurement procedures) may be performed. A measurement periodicity for the intermittent measurement procedures may be longer than a measurement periodicity for the frequent measurement procedures, and a measurement reporting periodicity (e.g. a reporting periodicity of measurement results) for the intermittent measurement procedures may be longer than a measurement reporting periodicity for the frequent measurement procedures. The RSRP thresholds may be set independently for the intermittent and frequent measurement procedures.

The satellite may signal, to the UE, configuration information (e.g. measurement periodicity, measurement reporting periodicity, and/or RSRP threshold) of the intermittent measurement procedures, configuration information (e.g. measurement periodicity, measurement reporting periodicity, and/or RSRP threshold) of the frequent measurement procedures, and/or the specific threshold for the value of the cell service timer. The UE may receive, from the satellite, the configuration information of the intermittent measurement procedures, configuration information of the frequent measurement procedures, and/or the specific threshold for the value of the cell service timer. If the value of the cell service timer exceeds the specific threshold, the UE may perform the intermittent measurement procedures based on the configuration information signaled from the satellite. If the value of the cell service timer is equal to or less than the specific threshold, the UE may perform the frequent measurement procedures based on the configuration information signaled from the satellite. According to the above-described method, the power consumption of the UE due to performing unnecessary measurement procedures can be reduced, and signaling overhead according to the measurement reporting procedures can be reduced.

In the LEO-based NTN, if a UE selects a specific cell of a satellite (e.g. LEO satellite), a possibility that a connection between the UE and the specific cell is maintained for a predetermined time may be large considering an orbit and/or movement speed of the satellite. If the value of the cell service timer cTimer is large, a possibility of (re)selecting a new cell in the NTN where the satellite's orbit is deterministic may be low. Therefore, a need for measurement procedures may be low. When the cell service timer is decreased, the possibility of cell (re)selection increases, so it may be preferable for the measurement procedures to be performed frequently. In the EMB-based NTN, the SAT service timer sTimer may be additionally used in addition to the cell service timer. The measurement periodicity may be adjusted based on the cell service timer and/or SAT service timer.

In the EMB-based NTN, a connection between the UE and the cell may be maintained for a time corresponding to the cell service timer (e.g. a time until the cell service timer becomes 0), and a connection between the UE and the satellite may be maintained for a time corresponding to the SAT service timer (e.g. a time until the SAT service timer becomes 0). It may be necessary for the measurement procedures to be performed taking into account the above-described operation plan of the satellite.

In the EMB-based NTN, the cell service time (e.g. cell service timer) and the SAT service time (e.g. SAT service timer) may be different. As the value of the cell service timer decreases, a time to perform a cell (re)selection procedure may get closer. In the NTN (e.g. EMB-based NTN), the measurement periodicity and/or the reporting periodicity of measurement results may be set variably based on the cell service timer and/or SAT service timer.

In the EMB-based NTN, the measurement periodicity and/or measurement reporting periodicity may be variably set based on at least one of the cell service timer or the SAT service timer. In the instant case, the performance of the measurement procedures may not be degraded and the measurement overhead may be reduced. That is, the UE's power consumption due to unnecessary measurements can be reduced, and signaling overhead due to the measurement reports can be reduced.

The cell service timer may be assigned (e.g. set) at a time when the UE selects a new cell (e.g. new serving cell, target cell). The SAT service timer may be assigned (e.g. set) at a time when the UE selects a new satellite (e.g. new serving satellite, target satellite). A multi-beam-based satellite may form (e.g. configure) a plurality of cells. A value (e.g. setting value, initial value) of each of the cell service timer and the SAT service timer may vary depending on the location of the satellite, location of the cell, and/or location of the UE. A value (e.g. setting value, initial value) of each of the cell service timer and the SAT service timer may be calculated based on at least one of ephemeris information of the satellite, information related to the cell, or location information of the UE.

If the value of the cell service timer is equal to or less than a first threshold, this may mean that a cell (re)selection procedure needs to be performed. If the value of the cell service timer is less than or equal to the first threshold, the UE may perform measurement procedures for cell (re) selection. If the value of the SAT service timer is equal to or less than a second threshold, this may mean that a satellite (re)selection procedure needs to be performed. If the value of the SAT service timer is equal to or less than the second threshold, the UE may perform measurement procedures for satellite (re)selection. If the value of the cell service timer is less than or equal to the first threshold or if the value of the SAT service timer is less than or equal to the second threshold, the UE may perform the frequent measurement procedures. If the value of the cell service timer is greater than or equal to the first threshold or if the value of the SAT service timer is greater than or equal to the second threshold, the UE may perform the intermittent measurement procedures. Alternatively, the UE may not perform the measurement procedures. According to the above-described method, the number of times the measurement procedure is performed can be reduced. The first threshold and the second threshold may be the same value. Alternatively, the first threshold value and the second threshold value may be different values. The base station may set each of the first and second thresholds and signal each of the first and second thresholds to the UE.

As another method, the measurement procedures (e.g. intermittent measurement procedures and/or frequent measurement procedures) may be performed independent of the value of the cell service timer. Since the UE moves to another cell depending on the location and/or mobility (e.g. speed and/or direction) of the UE, the measurement procedures may be performed taking into account the location and/or mobility of the UE. For example, if the UE's speed exceeds a speed threshold, the UE may perform the frequent measurement procedures. If the UE's speed is equal to or less than the threshold, the UE may perform the intermittent measurement procedures.

The minimum value of the measurement periodicity may be 20 milliseconds (ms). The measurement periodicity may be set based on Equation 1 below. The measurement reporting periodicity (i.e. reporting periodicity of measurement results) may be set to be the same as the measurement periodicity.

$$\text{measurement periodicity} = 20\ \text{msec} \times 2^{n} \qquad \text{[Equation 1]}$$

In Equation 1, n may be determined based on Equation 2 below.

$$n = \left\lfloor N \times f\left(\frac{cTimer}{\text{CTimer\_max}} \cdot \frac{1}{sTimer}\right) \right\rfloor \qquad \text{[Equation 2]}$$

N, cTimer_max, and/or f(x) may be configured by the base station to the UE. Alternatively, N, cTimer_max, and/or f(x) may be predefined in the technical specifications. Alternatively, N, cTimer_max, and/or f(x) may be determined by the UE. cTimer_max may be the maximum value of the cell service timer. cTimer may be the value (e.g. current value) of the cell service timer. sTimer may be the value (e.g. current value) of the SAT service timer. N may be a natural number.

As another method, n in Equation 1 may be set based on Table 6 below. The satellite may signal the information of Table 6 to the UE. The UE may receive the information of Table 6 from the satellite. Alternatively, Table 6 may be predefined in the technical specifications. In Table 6, sTimer may be the value (e.g. current value) of the SAT service timer, and cTimer may be the value (e.g. current value) of the cell service timer.

TABLE 6

| | sTimer | | | | | | | |
|---|---|---|---|---|---|---|---|---|
| | 20 min | | | 10 min | | | | 20 msec |
| cTimer | 2 min | 1 min | 20 msec | 2 min | 1 min | 20 msex | | 20 msex |
| n | X1 | X2 | X3 | X4 | X5 | X6 | . . . | $X_k$ |

The UE may determine the measurement periodicity based on Equation 1 and Table 6, identify the reception quality (e.g. RSRP, RSRQ, RSSI) of the satellite (e.g. base station) by performing measurement operations based on the measurement periodicity, and report the measurement results (e.g. reception quality) to the satellite (e.g. base station).

The reporting periodicity of the measurement results may be set to be the same as or different from the measurement periodicity. In addition, the satellite may estimate the measurement periodicity and/or measurement reporting periodicity from the UE based on Equation 1 and Table 6, and may receive measurement results from the UE based on the measurement periodicity and/or measurement reporting periodicity.

A time of performing the measurement reporting procedure may be configured with an offset (hereinafter referred to as 'reporting offset') with respect to a time of performing the measurement procedure. The satellite may set a reporting offset and signal information on the reporting offset to the UE. The UE may receive the information on the reporting offset from the satellite. The UE may perform a measurement procedure and perform a measurement reporting procedure after the reporting offset from the time of performing the measurement procedure. The satellite may receive measurement results from the UE considering the reporting offset. Alternatively, the reporting offset may be predefined in the technical specifications. Alternatively, the reporting offset may be set by the UE.

[Cell Selection Based on SAT Service Timer and Cell Service Timer]

The UE may receive an initial value of a cell service time (e.g. cell service timer) and/or an initial value of a SAT service time (e.g. SAT service timer) from the satellite. Further, the UE may receive at least one of an RSRP, satellite-UE distance, elevation angle, distance to the nadir, or ephemeris information through system information transmitted from the satellite. The cell service time value periodically transmitted from the satellite may have a different value for each cell and may be determined by the size of the cell and/or the altitude of the satellite. In other words, it may be assumed that the satellite does not set the cell service time differently for each UE. The UE may calculate the remaining cell service time and/or the remaining SAT service time based on at least one of the initial value of the cell service time, the initial value of the SAT service time, RSRP, satellite-UE distance, elevation angle, distance to the nadir, or ephemeris information received from the satellite. The UE may select a cell with the largest remaining cell service time. In addition, if a difference between the remaining cell service times of a plurality of cells is within a preset value, the UE may select a cell with the largest SAT service time.

[Cell Reselection Based on SAT Service Timer and Cell Service Timer]

The UE may receive a value of a cell service time (e.g. cell service timer). Alternatively, when reselecting a cell, the UE may calculate the remaining cell service time value using at least one of ephemeris information, an initial value of the cell service time, and a distance between a cell center and the UE. The remaining cell service time value may have a different value each time a cell is selected by each UE, and may decrease after a predetermined time. Meanwhile, the satellite and/or the UE may calculate at least one of location information of the satellite or cell or location information of the UE using at least one of the accuracy of ephemeris information, network configuration information, and constellation configuration information. If the ephemeris information is accurate, cell selection may be possible without RSRP information, and if RSRP measurement values are accurate, cell selection may be possible without ephemeris information. That is, various cell selection methods may be possible depending on the accuracy of the ephemeris information and the accuracy of the RSRP measurement values. Therefore, there is a need to consider cell selection methods according to the accuracy of ephemeris information.

Figure 11:
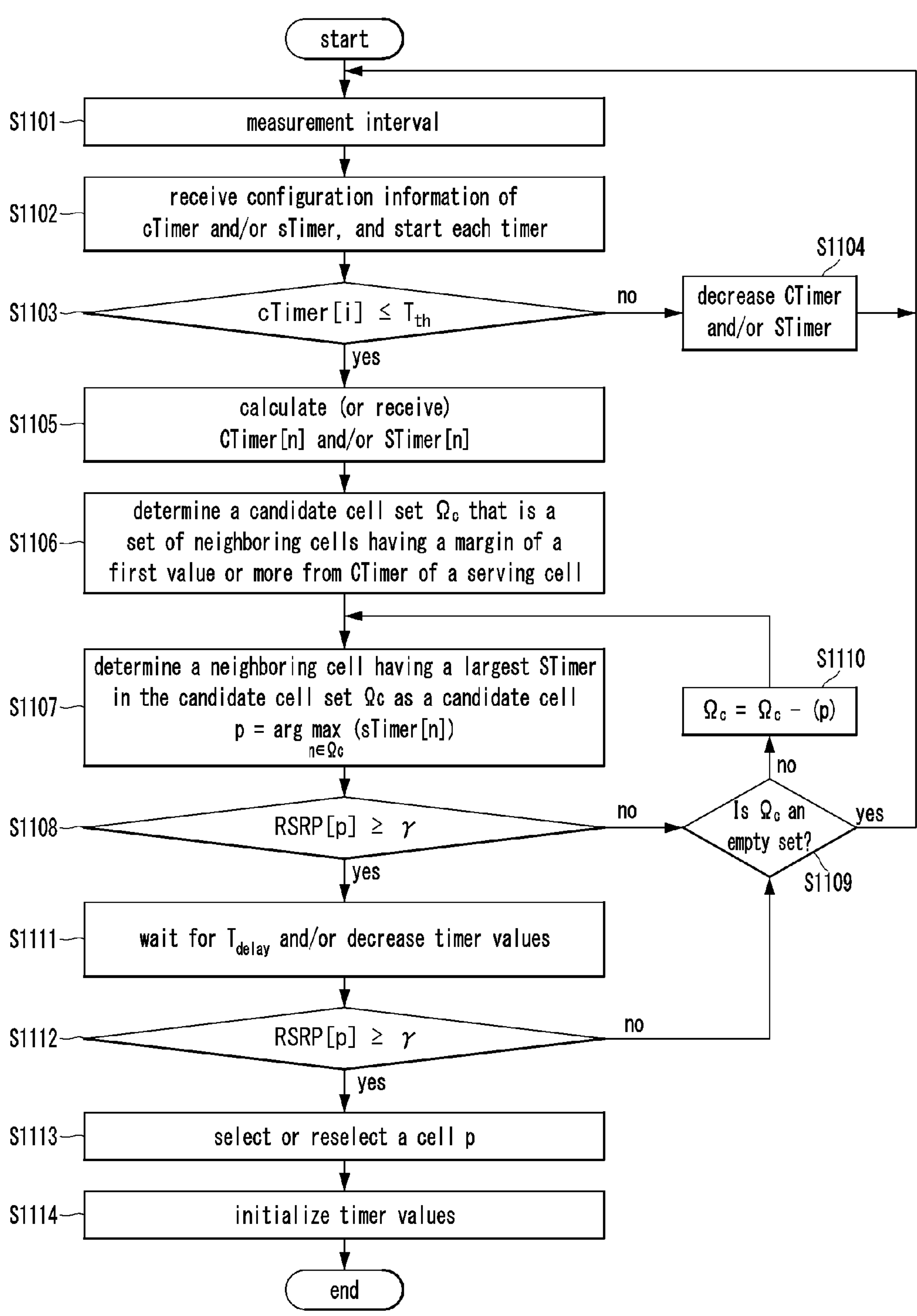
FIG. 11 is a flowchart illustrating a first exemplary embodiment of a cell reselection procedure in an EMB environment supporting multiple beams.

FIG. 11 is a flowchart illustrating a first exemplary embodiment of a cell reselection procedure in an EMB environment supporting multiple beams.

As shown in FIG. 11, an NTN may include at least one satellite and a UE. The satellite may form a plurality of cells and perform base station functions. That is, the satellite may include a base station. Operations of the cell may be operations of the base station and/or operations of the satellite. The satellite may transmit configuration information of cTimer and/or sTimer to the UE. The configuration information of cTimer and/or sTimer described above may include at least one of SAT service time information, ephemeris information of the satellite, location information of a center of the cell, cell information (e.g. cell radius and/or cell shape), cTimer threshold $T_{th}$, maximum number N of neighboring cells, timer margin $\delta$, RSRP threshold $\gamma$, information on cTimer or sTimer, and/or the like.

The UE may receive the configuration information of cTimer and/or sTimer from the satellite, and start each timer (i.e. decrease according to a decrement interval) (S1101). When the UE is connected to a cell of the satellite, the UE may decrease cTimer and/or sTimer according to the decrement interval. The UE may measure a reception quality (e.g. RSRP) of each of at least one cell according to a measurement interval (S1102). The UE may receive a reference signal (e.g. channel state information reference signal (CSI-RS)) and/or synchronization signal (SS)/physical broadcast channel (PBCH) block for RSRP measurement), and the measurement interval may be variable. The UE may receive configuration information on a measurement periodicity and/or measurement reporting periodicity from the satellite.

The UE may compare a cell service time for a cell (i.e. serving cell) to which it belongs with a preset threshold (e.g. $T_{th}$) (S1103), and if the cell service time is less than or equal to the preset threshold, the UE may obtain (or calculate) cTimer and/or sTimer of one or more neighboring cells (S1105). The number of neighboring cells for which the UE calculates cTimer and/or sTimer may be set to a maximum of N. On the other hand, if the cell service time of the serving cell exceeds the preset threshold, the UE may decrease cTimer and/or sTimer and perform again from the step S1101 (S1104).

The UE may identify cTimer, cTimer decrement interval, and/or cTimer threshold of each neighboring cell based on one or more information elements defined in Table 7 below, ephemeris information of the satellite, location information of the UE (e.g. location information of the UE obtained through a GNSS), a distance from the UE to a center of each cell, and/or a distance from the center of each cell to the nadir. Alternatively, cTimer, cTimer decrement interval, and/or cTimer threshold may be predefined in the technical specifications. In this case, the UE may know cTimer, cTimer decrement interval, and/or cTimer threshold without signaling from the satellite.

TABLE 7

| Information elements |
|---|
| CTimer (e.g. initial value, setting value, and/or maximum value of CTimer) |
| Parameter(s) for determining CTimer |
| Decrement interval of CTimer |
| Parameter(s) for determining the decrement interval of CTimer |
| CTimer threshold (e.g. first threshold T1) |

The UE may identify sTimer, sTimer decrement interval, and/or sTimer threshold of each neighboring cell based on one or more information elements defined in Table 8 below, ephemeris information of the satellite, location information of the UE (e.g. location information of the UE obtained through a GNSS), a distance from the UE to a center of each cell, and/or a distance from the center of each cell to the nadir. Alternatively, sTimer, sTimer decrement interval, and/or sTimer threshold may be predefined in the technical specifications. In the instant case, the UE may know sTimer, sTimer decrement interval, and/or sTimer threshold without signaling from the satellite.

TABLE 8

| Information elements |
|---|
| STimer (e.g. initial value, setting value, and/or maximum value of STimer) |
| Parameter(s) for determining STimer |
| Decrement interval of STimer |
| Parameter(s) for determining the decrement interval of STimer |
| STimer threshold (e.g. second threshold T2) |

The terminal may calculate timer values based on at least one of the SAT service time information, ephemeris information of the satellite, location information of a center of the cell, cell information (e.g. cell radius and/or cell shape), cTimer threshold $T_{th}$, maximum number N of neighboring cells, timer margin $\delta$, RSRP threshold $\gamma$, information on cTimer or sTimer, and/or the like which are received from the satellite. Alternatively, the UE may periodically receive cTimer value from the satellite.

Among the cells from which the UE has received the cell service timer values, the UE may determine a set (hereinafter, 'candidate cell set') of cells having cell service timer values that exceed a sum of a cell service timer value of the serving cell and a preset first value (e.g. timer margin $\delta$) as shown in Equation 3 below (S1106). Here, n may represent an index of a neighboring cell, and cTimer[n] may represent a cell service time of the neighboring cell. In addition, i may indicate an index of the serving cell, and cTimer[i] may indicate a cell service time of the serving cell.

$$\Omega_c = \{n \mid cTimer[n] > CTimer[i] + \delta\} \quad \text{[Equation 3]}$$

The UE may select a cell with the largest SAT service time (e.g. sTimer) value among neighboring cells in the candidate cell set as a candidate cell p (S1107). Here, if there are multiple cells with the largest sTimer value among the neighboring cells in the candidate cell set, the UE may randomly select one neighboring cell as the candidate cell.

If an RSRP measurement value for the candidate cell is less than a second value (e.g. RSRP threshold γ) for a preset time, the UE may select a neighboring cell with the second largest sTimer value as the candidate cell p. That is, the UE may determine whether the number of elements of the candidate cell set $\Omega_c$ (or 'the above-described candidate cell set $\Omega_c$—the number of candidate cells whose RSRP is determined to be less than the second threshold in the step S1108") is 0. (S1109). In addition, if the number of elements in the candidate cell set $\Omega_c$ is not 0, the UE may obtain $\Omega_c=\Omega_c-\{p\}$ and may perform again from the step S1107. This process may be repeated until the set $\Omega_c$ becomes an empty set. When the set $\Omega_c$ is an empty set (S1109), the UE may determine that the cell (re)selection procedure has failed and perform the procedure again from the step S1101.

If the RSRP measurement value for the candidate cell p is equal to or greater than the second value (e.g. RSRP threshold γ) for a preset time, the UE may delay for $T_{delay}$ and/or decrease the timer values (S1111), and the UE may determine whether the RSRP measurement value for the candidate cell p continues to be equal to or greater than the second value (e.g. RSRP threshold γ) for a preset time (S1112). The preset time may be a time from a time of performing the step S1108 to a time of performing the step S1112. If a situation occurs in which the RSRP measurement value for the candidate cell p is less than the threshold γ for the preset time, the UE may perform from the step S1109. If the RSRP measurement value for the candidate cell p continues to be equal to or greater than γ for the preset time, the UE may finally select and/or reselect the candidate cell p (S1113) and initialize the timer values (S1114). The UE may finally perform communication with the (re)selected candidate cell p.

The methods according to an exemplary embodiment of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of a user equipment (UE), the method comprising:

comparing, by a processor, a value of a cell service timer of a serving cell with a first value, the value of the cell service timer indicating a time during which communication services of the serving cell can be provided;

in response that the value of the cell service timer of the serving cell is less than or equal to the first value, obtaining, by the processor, configuration information of a cell service timer of each of at least one neighboring cell;

configuring, by the processor, a candidate cell set which is a set of one or more neighboring cells among the at least one neighboring cell, the one or more neighboring cells having a value of a cell service timer greater than a sum of the value of the cell service timer of the serving cell and a second value;

selecting, by the processor, a candidate cell from among the one or more neighboring cells based on a value of a satellite (SAT) service timer of each of the one or more neighboring cells belonging to the candidate cell set; and performing, by the processor, a connection establishment procedure with the candidate cell, wherein the value of the SAT service timer indicates a time during which communication services can be provided in coverage of a satellite associated with each of the one or more neighboring cells, and in response that the value of the cell service timer of the serving cell exceeds the first value, the UE does not receive the configuration information of the cell service timer of each of at least one neighboring cell.

2. The method of claim 1, further including:

before the comparing of the value of the cell service timer of the serving cell with the first value, receiving, by the processor, configuration information of the cell service timer of the serving cell from a satellite, wherein the configuration information of the cell service timer of the serving cell includes at least one of an initial value of the cell service timer of the serving cell, location information of the UE, ephemeris information of the satellite, or elevation angle information of the satellite.

3. The method of claim 1, further including:

before the comparing of the value of the cell service timer of the serving cell with the first value, obtaining, by the processor, the value of the cell service timer of the serving cell, which is preset in the UE.

4. The method of claim 1, wherein the cell service timer of the serving cell starts after the UE is connected to the serving cell, and the SAT service timer starts after the UE is connected to the satellite.

5. The method of claim 1, wherein in the selecting of the candidate cell from among the one or more neighboring cells based on the value of the SAT service timer of each of the one or more neighboring cells belonging to the candidate cell set, a neighboring cell with a largest value of the SAT service timer among the one or more neighboring cells is determined as the candidate cell.

6. The method of claim 5, further including, after determining a neighboring cell with a largest value of the SAT service timer among the at least one neighboring cell belonging to the candidate cell set as the candidate cell, measuring, by the processor, a reception quality of the candidate cell for a preset time; and in response that the reception quality of the candidate cell is equal to or higher than a third value for a preset time, performing, by the processor, a connection establishment procedure with the candidate cell.

7. The method of claim 5, further including, after determining a neighboring cell with a largest value of the SAT service timer among the at least one neighboring cell belonging to the candidate cell set as the candidate cell, measuring, by the processor, a reception quality of the candidate cell for a preset time; and in response that the reception quality of the candidate cell is less than a third value and a number of cells belonging to the candidate cell set is plural, determining, by the processor, a cell with a second largest value of the SAT service timer among cells belonging to the candidate cell set as the candidate cell.

8. The method of claim 1, further including:

receiving, by the processor, variable measurement configuration information from a satellite; and performing, by the processor, variable measurement procedures instead of general measurement procedures based on the variable measurement configuration information, wherein a measurement periodicity in the variable measurement procedures is shorter than a measurement periodicity in the general measurement procedures.

9. The method of claim 8, wherein the variable measurement configuration information includes intermittent measurement configuration information and frequent measurement configuration information, intermittent measurement procedures are performed based on the intermittent measurement configuration information in response that the value of the cell service timer of the serving cell exceeds a fourth value, and frequent measurement procedures are performed based on the frequent measurement configuration information in response that a value of a cell service timer of the candidate cell is less than or equal to the fourth value.

10. The method of claim 1, further including: in response that the value of the cell service timer of the serving cell is equal to or less than a threshold, triggering, by the processor, a cell reselection procedure.

11. A user equipment (UE) comprising:

a processor; and a memory storing one or more instructions executable by the processor, wherein the one or more instructions are executed to perform:

receiving configuration information of a cell service timer of a serving cell from a satellite, the cell service timer indicating a time during which communication services of the serving cell can be provided;

comparing a value of the cell service timer of the serving cell with a first value;

in response that the value of the cell service timer of the serving cell is less than or equal to the first value, obtaining configuration information of a cell service timer of each of at least one neighboring cell;

configuring a candidate cell set which is a set of one or more neighboring cells among the at least one neighboring cell, the one or more neighboring cells having a value of a cell service timer greater than a sum of the value of the cell service timer of the serving cell and a second value;

selecting a candidate cell from among the one or more neighboring cells based on a value of a satellite (SAT) service timer of each of the one or more neighboring cells belonging to the candidate cell set; and performing a connection establishment procedure with the candidate cell, wherein the value of the SAT service timer indicates a time during which communication services can be provided in coverage of a satellite associated with each of the one or more neighboring cells, and in response that the value of the cell service timer of the serving cell exceeds the first value, the UE does not receive the configuration information of the cell service timer of each of at least one neighboring cell.

12. The UE of claim 11, wherein the configuration information of the cell service timer of the serving cell includes at least one of an initial value of the cell service timer of the serving cell, location information of the UE, ephemeris information of the satellite, or elevation angle information of the satellite.

13. The UE of claim 11, wherein in the comparing of the value of the cell service timer of the serving cell with the first value, the one or more instructions are further executed to perform:

obtaining the value of the cell service timer of the serving cell, which is preset in the UE.

14. The UE of claim 11, wherein the cell service timer of the serving cell starts after the UE is connected to the serving cell, and the SAT service timer starts after the UE is connected to the satellite.

15. The UE of claim 11, wherein in the selecting of the candidate cell from among the one or more neighboring cells based on the value of the SAT service timer of each of the one or more neighboring cells belonging to the candidate cell set, the one or more instructions are further executed to perform:

selecting a neighboring cell with a largest value of the SAT service timer among the one or more neighboring cells as the candidate cell.

16. The UE of claim 15, wherein when a neighboring cell with a largest value of the SAT service timer among the at least one neighboring cell belonging to the candidate cell set is determined as the candidate cell, the one or more instructions are further executed to perform:

measuring a reception quality of the candidate cell for a preset time; and in response that the reception quality of the candidate cell is equal to or higher than a third value for a preset time, performing communication with the candidate cell.

17. The UE of claim 15, wherein when a neighboring cell with a largest value of the SAT service timer among the at least one neighboring cell belonging to the candidate cell set is determined as the candidate cell, the one or more instructions are further executed to perform:

measuring a reception quality of the candidate cell for a preset time; and in response that the reception quality of the candidate cell is less than a third value and a number of cells belonging to the candidate cell set is plural, determining a cell with a second largest value of the SAT service timer among cells belonging to the candidate cell set as the candidate cell.

18. The UE of claim 11, wherein the one or more instructions are further executed to perform:

receiving variable measurement configuration information from the satellite; and performing variable measurement procedures instead of general measurement procedures based on the variable measurement configuration information, wherein a measurement periodicity in the variable measurement procedures is shorter than a measurement periodicity in the general measurement procedures.

19. The UE of claim 18, wherein the variable measurement configuration information includes intermittent measurement configuration information and frequent measurement configuration information, intermittent measurement procedures are performed based on the intermittent measurement configuration information in response that the value of the cell service timer of the serving cell exceeds a fourth value, and frequent measurement procedures are performed based on the frequent measurement configuration information in response that a value of a cell service timer of the candidate cell is less than or equal to the fourth value.

20. The UE of claim 11, wherein the one or more instructions are further executed to perform: in response that the value of the cell service timer of the serving cell is equal to or less than a threshold, triggering a cell reselection procedure.

* * * * *